United States Patent
Goodwill

(10) Patent No.: US 10,505,633 B2
(45) Date of Patent: Dec. 10, 2019

(54) METHOD AND SYSTEM FOR FREQUENCY SHIFTED FEEDBACK PATH

(71) Applicant: Dominic John Goodwill, Ottawa (CA)

(72) Inventor: Dominic John Goodwill, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/966,128

(22) Filed: Apr. 30, 2018

(65) Prior Publication Data

US 2019/0334621 A1 Oct. 31, 2019

(51) Int. Cl.
*H04B 10/2575* (2013.01)
*H04B 10/69* (2013.01)

(52) U.S. Cl.
CPC ..... *H04B 10/25752* (2013.01); *H04B 10/697* (2013.01)

(58) Field of Classification Search
CPC ................................. H04B 10/2575–25759
See application file for complete search history.

(56) References Cited

U.S. PATENT DOCUMENTS

| | | | |
|---|---|---|---|
| 7,665,891 | B1 | 2/2010 | Savchenkov et al. |
| 9,832,002 | B2 | 11/2017 | Xu et al. |
| 2016/0112134 | A1* | 4/2016 | Masunaga ........... H04B 10/0799 398/115 |
| 2017/0093495 | A1* | 3/2017 | Lozhkin ............ H04B 10/25753 |

FOREIGN PATENT DOCUMENTS

| | | |
|---|---|---|
| CN | 102621551 A | 8/2012 |
| CN | 102724153 A | 10/2012 |

OTHER PUBLICATIONS

Single-Model Single-Feedback Digital Predistortion for Concurrent Multi-Bank Wireless Transmitters. IEEE Transactions on Microwave Theory and Techniques, vol. 63. No. 7. Jul. 2015.
Maxim RF mixer MAX19996A: SiGe, High-Linearity, 2000MHz to 3900MHz Downconversion Mixer with LO Buffer, 19-4402; Rev 1; May 2009.
Sketch illustrating the meaning of ACLR (adjacent channel leakage ratio), from https://www.maximintegrated.com/en/app-notes/index.mvp/id/3902.
RF Predistortion (RFPD) vs. Digital Predistortion (DPD), from https://www.maximintegrated.com/en/products/comms/wireless-rf/rf-predistorters/predistortion-linearization/rfpal-technology/rfpd-vs-dpd.html.
International Journal of Microwave and Wireless Technologies: Direct and external modulation of IF over fiber systems for 60 GHz wireless applications, May 2015.

* cited by examiner

*Primary Examiner* — Shi K Li

(57) ABSTRACT

An aspect of the disclosure provides a system for transmitting a radio frequency (RF) signal from a source to a destination. Such a system includes an RF signal source configured to produce an RF signal at a transmission frequency. The system further includes an optical transmission path for optically transmitting the RF signal towards the destination. The system also includes a feedback path for transmitting a feedback signal received proximate the destination towards the RF signal source. The feedback path includes a frequency shifter for shifting the frequency of the feedback signal to a feedback frequency different than the transmission frequency.

19 Claims, 18 Drawing Sheets

METHOD AND SYSTEM FOR FREQUENCY SHIFTED FEEDBACK PATH

TECHNICAL FIELD

This disclosure relates to the field of optical communication networks in general, and to the field of Radio Frequency signals transmitted using optical fiber in particular.

BACKGROUND

For wireless networks, data is transmitted between base-stations and user equipment (UE) using radio frequency (RF) signals. The RF signals are generated by an RF signal source, and transmitted via an analog RF transmission link to an RF amplifier for amplification prior to transmission via a cell tower RF antenna. Traditionally, the analog RF transmission link comprises electrical elements such as RF analog cables It is known that such an RF amplifier adds distortion to the RF signal being amplified. One known solution to this problem is to utilize a pre-distorter (typically a digital signal processor (DSP)) and a feedback path. The feedback path couples a portion of the output from the RF amplifier to the pre-distorter, which pre-distorts the signal being amplified to compensate for the distortion added by the RF amplifier.

For next generation RF networks, a separation between a base station (which processes the signal) and cell tower (which transmits and receives the RF signals over the air) has been proposed to allow for network virtualization which will allow for more flexible network architectures. For example, radio base band units (BBUs) will process the signals which are transmitted over the air by remote radio heads (RRHs). Such an architecture does not require the base-stations (e.g., the BBUs) to be co-located with the cell towers (e.g, RRHs). Such an architecture can allow for a single BBU to support multiple RRHs. Furthermore, such an architecture allows for more flexible cell tower placements, by reducing the signal processing required at the cell tower. Accordingly the signal processing occurs at the Base-Station. However this separation between base-station and cell tower requires the RF signals to be transmitted between a first location that processes the signal (such as a base-station) and a second location, such as a cell tower, that transmits and receives the RF signals over the air. Thus, the downlink (network to user) RF signal must be transmitted from a first to a second location. Similarly, the uplink (user to network) RF signal must be carried from the second to the first location.

To allow for the distance from the base-station to the cell tower to increase beyond the range of RF analog cables, RF analog cables are being replaced by optical waveguides, where such optical waveguides may comprise optical fibers. Accordingly Radio over Fiber (RoF) links are implemented to carry the RF signals from the Base Station to the cell tower.

However there is a need to address distortions/impairments introduced by such RoF links, in addition to the distortion impairments introduced by the RF amplifier as outlined above. This additional need increases as the separation between base-station and cell tower increases, thus increasing the length of the RoF links.

SUMMARY

Aspects of the disclosure provide a system and method used for providing an improved optical feedback path for an optical transmission system.

An aspect of the disclosure provides a system for transmitting a radio frequency (RF) signal from a source to a destination. Such a system includes an RF signal source configured to produce an RF signal at a transmission frequency. The system further includes an optical transmission path for optically transmitting the RF signal towards the destination. The system also includes a feedback path for transmitting a feedback signal received proximate the destination towards the RF signal source. The feedback path includes a frequency shifter for shifting the frequency of the feedback signal to a feedback frequency different than the transmission frequency. It should be appreciated that more precisely, the feedback signal has a center feedback frequency and a frequency bandwidth, and the frequency shifter shifts the center feedback frequency. In some embodiments, the optical transmission path converts the RF signal into an optical RF signal which is transmitted via an optical waveguide towards the destination and converted to an electrical RF signal at the transmission frequency proximate to the destination. In such embodiments, the feedback path further includes an RF tap for forwarding a portion of the electrical RF signal to the frequency shifter which produces a feedback electrical RF signal, and a feedback optical transmission path for converting the feedback electrical RF signal into a feedback optical signal at the feedback frequency which is transmitted towards the RF signal source. In some embodiments, the frequency shifter is configured such that the feedback frequency is within a feedback frequency range which is less susceptible to impairments introduced during optical transmission than the transmission frequency. In some embodiments, the system further includes a pre-distorter for applying pre-distortion to the RF signal to compensate for distortion which occurs before the RF tap, with the pre-distortion dependent on the feedback signal. In some embodiments, the system further includes a controller which receives the feedback signal and transmits a control signal to the pre-distorter. In some embodiments, the RF tap is located before the RF power amplifier. In some embodiments, the RF tap is located after the RF power amplifier. In some embodiments, the RF tap is located before the RF power amplifier to produce a first tapped signal. In some embodiments the system further includes a second RF tap located after the RF power amplifier to produce a second tapped signal, and a switch for selectively coupling the frequency shifter between the first tapped signal and the second tapped signal. In some such embodiments, the RF signal source, the optical transmission path and the RF tap comprise a first downlink path. Some such embodiments further includes a second downlink path at a second transmission frequency, and a selector switch for selectively coupling a tapped signal to the frequency shifter, the tapped signal selected from an RF tap of the first and second downlink paths such that feedback path is shared between the first downlink path and the second downlink path. In some such embodiments, the frequency shifter is configurable to shift the tapped signal to be within a feedback frequency range regardless of whether tapped signal is selected from the first downlink path or the second downlink path. Some such embodiments further include a frequency controller for configuring the frequency shifter such that the output from the frequency shifter is within the feedback frequency range for the feedback optical transmission path. In some such embodiments, the selector switch is configured to route tapped signals to a frequency shifter bypass for tapped signals which are already within the feedback frequency range. In some embodiments the system further includes a downlink path frequency shifter located after the RF tap for up-converting the electrical RF signal to a microwave signal. In some embodiments the system further includes a bandpass filter that filters the RF spectrum of the feedback signal such that only a portion of the RF spectrum is transmitted on the optical feedback transmission path. In some such embodiments the portion includes two sub-portions. In some embodiments, the bandpass filter is configured to pass distortion information sufficient for the controller to determine the pre-distortion to be applied by the pre-distorter. In some embodiments the system further includes a controller which monitors the feedback signal for faults.

Another aspect of the disclosure provides system for transmitting a radio frequency (RF) signal over an optical fiber. Such a system includes an RF signal source configured to produce an RF signal at a transmission frequency, a pre-distorter for pre-distorting the RF signal and an RF power amplifier. Such a system further includes a first Radio over Fiber (RoF) link for converting the RF signal into an RF optical signal and transmitting the RF optical signal from the radio frequency (RF) signal source towards the RF power amplifier. The RoF link includes an optical transmitter, an optical fiber, and an optical receiver which converts the RF optical signal into an RF electrical signal. The system further includes a feedback path including an RF analog tap for coupling a portion of the RF electrical signal to a second RoF link for transmitting the RF electrical signal towards the pre-distorter, the RF analog tap being disposed between the optical receiver and the RF power amplifier. In some embodiments, the feedback path further includes a frequency shifter which receives the portion of the RF electrical signal and outputs a frequency shifted RF signal, the frequency shifted RF signal being different than the transmission frequency. In some embodiments, the frequency shifted RF signal is at a frequency subject to less impairments introduced by the RoF link than the transmission frequency. In some embodiments, the RF signal source, the first RoF link and the analog tap comprise a first downlink path. Such embodiments further include a second downlink path at a second transmission frequency, and a selector switch for selectively coupling a tapped signal to the frequency shifter, the tapped signal selected from an analog tap of the first and second downlink paths such that feedback path is shared between the first downlink path and the second downlink path.

Another aspect of the disclosure provides method for transmitting a radio frequency (RF) signal over an optical fiber. Such a method includes optically transmitting an RF signal a transmission frequency. The method further converting the optical RF signal into an electrical RF signal and tapping the electrical RF signal. The method also includes frequency shifting the tapped signal, and optically transmitting the frequency shifted tapped signal as a feedback signal.

The foregoing and other objects, features, aspects and advantages of the present invention will become more apparent from the following detailed description, taken in conjunction with the accompanying drawings which description is by way of example only.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIG. 8 illustrates case A, FIG. 9 illustrates Case B, FIG. 10 illustrates case C and FIG. 11 illustrates Case D, according to embodiments of the disclosure;

DESCRIPTION OF EMBODIMENTS

Figure 1:
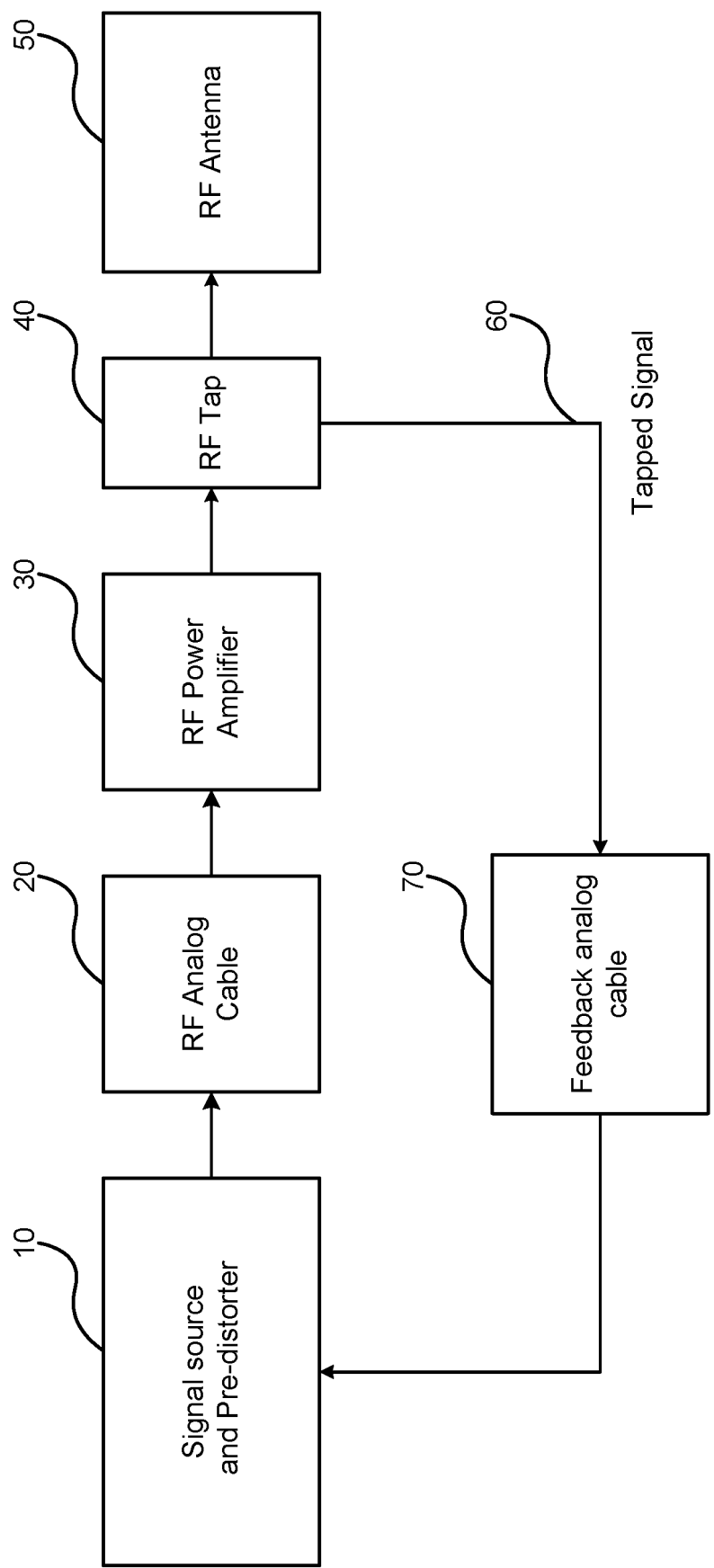
FIG. 1 illustrates an RF system including a feedback path to enable pre-distortion for an RF amplifier.

FIG. 1 illustrates a wireless network system including a feedback path to enable pre-distortion for an RF amplifier or to enable the detection of faults in the signal path. The RF system includes a signal source 10 which produces an RF signal, which is typically modulated with data to be transmitted. The signal source 10 is configured to produce an RF signal at a transmission frequency which is the frequency that is used by the wireless network. The RF signal is carried by RF analog cable 20 to RF Power Amplifier 30. RF Power Amplifier 30 amplifies the RF signal for wireless transmission to UE via the RG antenna 50. For conventional wireless networks, such a system is typically implemented using a base-station as the signal source 10 and the RF antenna is part of a cell tower. Typically the base-station and cell tower are co-located. It is known that the RF power amplifier 30 adds distortion to the signal. Pre-distortion is a known technique to compensate for such added distortion, by adding to the RF output signal an inverse of the expected distortion, such that the output from the RF power amplifier is close to original RF output signal. In the example illustrated in FIG. 1, the signal source 10 also includes a pre-distorter for distorting the signal output from the source in such a manner as to compensate for distortion added by the RF Power Amplifier 30. It should be appreciated that the pre-distorter can be included as part of the signal source, or alternatively be a separate component. The pre-distorter uses a copy of the downlink signal (i.e., the feedback signal) to calculate the required pre-distortion to compensate for unwanted added distortion. Analog pre-distortion is performed on an analog representation of the signal. Alternatively, Digital pre-distortion (DPD) is performed on a digital representation of the signal, typically by means of a digital signal processor (DSP). FIG. 1 also illustrates a control loop including a feedback path which provides a copy of the output of the RF power amplifier 30 to the pre-distorter to provide the pre-distorter with information as to the amount of distortion added by the RF power amplifier. The pre-distorter uses this information to apply pre-distortion to the RF output signal. The feedback path includes an RF tap 40 for tapping a portion of the output from the RF power amplifier 30 and delivers this to the pre-distorter by means of feedback analog cable 70. If digital pre-distortion is used, an Analog to Digital (A-to-D) converter is used to form a digital representation of the feedback signal for use by the DSP. Alternatively, the pre-distorter may be omitted and instead a fault detector (not shown) may be provided at the output of the feedback analog cable 70, so as to detect or measure faults in the RF analog cable 20 or the RF power amplifier 30.

Figure 2:
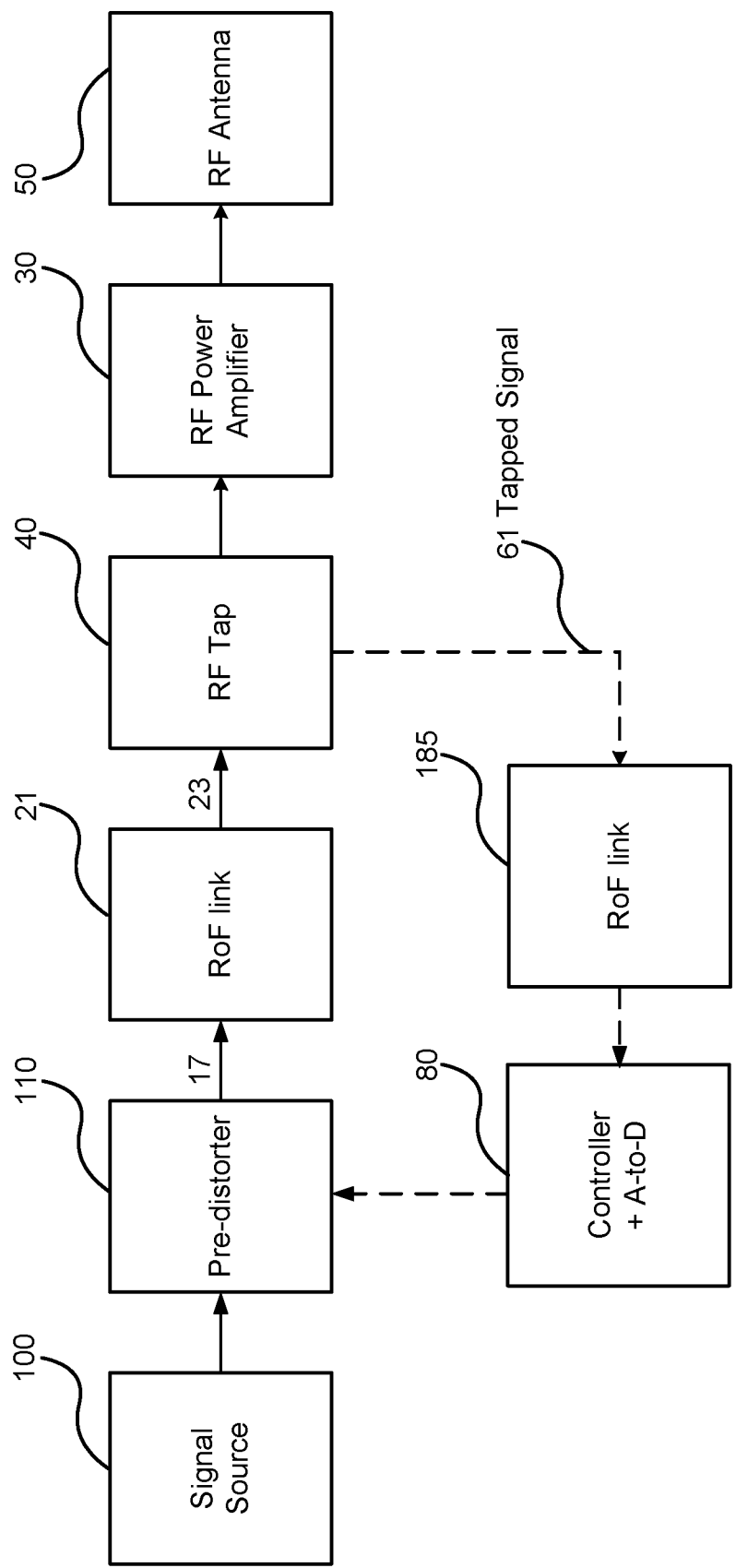
FIG. 2 illustrates an RF system including a feedback path to enable pre-distortion for a system transmitting RF optical signals according to an embodiment of the disclosure.

Next generation wireless systems are proposing a separation between the base station and the cell tower, with a separation distance such that an RF analog cable 20 cannot be effectively used. Fiber optics can be more effectively used to transmit RF signals over significantly longer distance than RF analog cables. However fiber optic transmission can itself add impairments, which can increase with distance. In general, the purpose of an RoF link is to convey an RF signal as faithfully as possible, and thus the impairments are generally specified in the RF domain, regardless of whether their underlying cause is optical elements or RF elements. Such impairments may comprise distortion and noise. The distortion and noise may be spectrally flat (white) or have a dependence upon frequency (colored). Accordingly FIG. 2 illustrates an RF system including a feedback path to enable pre-distortion for a system transmitting RF optical signals according to an embodiment of the disclosure. FIG. 2 illustrates a downlink path and a feedback path; an RF system may also comprise an uplink path, but this is omitted from FIG. 2 for clarity. FIG. 2 illustrates an RF signal source 100 separate from the pre-distorter 110. It should be appreciated that this separation is not required and the pre-distorter 110 and the signal source 100 can be integrated into a single node. The signal source 100 is configured to produce an RF signal at a transmission frequency utilized by the wireless network. The output from the pre-distorter 110 is an analog electrical RF signal 17, which is converted to an optical RF signal for optical transmission over an optical transmission path such as an Radio over Fiber (RoF) link 21. After transmission over the length of the RoF link 21, the RoF link 21 coverts the optical signal into an analog electrical RF signal 23. Analog electrical RF signal 23 is then amplified by the RF power amplifier 30 for wireless transmission via RF antenna 50. A portion 61 of the analog electrical RF signal 23 is supplied to a feedback path via RF tap 40. RF tap 40 can be digital or analog in nature, but for the purposes of examples described herein, an analog RF tap will be assumed. The tapped signal 61 is converted to an optical RF signal for optical transmission over a fiber optic cable before being converted back to an analog electrical RF signal by a feedback path RoF link 185. The output from the RoF 185 is supplied to a controller 80 which sends control signals to the pre-distorter 110 for adjusting the amount of distortion added by the pre-distorter 110 to compensate for the distortion/impairments introduced over the RoF link 21.

If pre-distorter 110 is a DSP or otherwise uses digital pre-distortion, the controller 80 can also include an A-to-D converter as shown. It is noted that the A-to-D converter need not be integrated with the controller and can be a separate component. Furthermore, in some embodiments the controller 80 can be integrated with the pre-distorter 110. Alternatively, in some embodiments, a fault detector (not shown) may be provided at the output of the feedback path RoF link 185, so as to detect or measure faults in the RoF link 21 or the RF power amplifier 30. In such embodiments, the controller 80 and pre-distorter 110 may be present or may be omitted.

Each RoF link 21, 185 includes an optical transmitter (including a laser) for converting the analog electrical RF signal into an optical RF signal, an optical waveguide (such as a length of fiber optic cable) within which the optical RF signal traverses, and an optical receiver which converts the received optical signal back into an electrical RF signal. More specifically, an RoF connection (whether for downlink, uplink or feedback) may comprise a semiconductor DFB laser, an optical fiber and a photoreceiver. An optical modulator may be used with the laser, or the laser may be directly modulated. Additional optical elements such as an optical bandpass filter, optical amplifier, optical dispersion compensator, optical multiplexer, optical demultiplexer may also be used. Additional electrical elements such as an electrical bandpass filter, electrical amplifier, and electrical impedance matching may be used. An electrical filter may be implemented as an analog element within the path or as part of the DSP.

In some embodiments, the feedback path can utilize (i.e., share) components of the uplink path from the cell tower (radio antenna) to the base-station. In other embodiments, a dedicated feedback path is utilized.

The effectiveness of the system of FIG. 2 can depend on such factors as the quality of the optical and electro-optic components used, as well as the operating RF frequencies carried by the system.

It is desirable for the feedback path to have higher signal integrity than the downlink path, because of the general rule that a measurement system must be better than the system that the system that it is trying to measure. The feedback path, in providing input for the pre-distorter, is effectively measuring the distortion of the downlink path, so that the pre-distorter can compensate for the distortion of said path. In this context, signal integrity refers to the quality of an output signal compared to an input signal as the signal passes through a medium or device (such as an analog RF cable, RoF link, RF power amplifier). Accordingly, the less impairment introduced by such a medium or device, the higher the signal integrity (of the output signal).

Accordingly some embodiments can utilize an RoF feedback connection for the feedback path, using especially high quality optical devices (for example, lasers with especially low RIN (relative intensity noise), or optical modulators with low chirp). However, this can add significant expense, because the cost of electro-optic components climbs rapidly with quality. Indeed, as an example RoF downlink path for a 5G network with a desired 55 dB signal-to-noise ratio over a 200 MHz signal bandwidth, a laser with RIN of −155 dB/Hz at the RF downlink operating frequency is required. Accordingly for the feedback path, the laser should have a better quality, for example RIN of −160 dB/Hz at the RF downlink operating frequency, which would require higher cost components.

Furthermore, in practice, it may be desirable to carry the copy of the downlink signal using similar devices as are used for the RoF uplink connection, to simplify the design of the equipment at the cell tower, and to minimize cost. Accordingly embodiments of the disclosure provide a system which improves the signal integrity of the feedback path, without using more expensive or complicated optical and electro-optic components in the feedback path.

Lasers for use in an RoF link may comprise semiconductor diode lasers that have lower RIN in the few-100 MHz to few-GHz (e.g. 2 to 3 GHz) RF frequency range than at the 5 to 10 GHz range. Further, it is known that the signal integrity penalty due to fiber dispersion is less at lower RF frequencies (for example 2 to 3 GHz) than at higher frequencies such as 5 to 10 GHz. Accordingly embodiments down-convert (also known as downshift) a high frequency RF signal to lower frequency for the feedback path.

Conversely, it is difficult to design a RoF feedback connection that has very wide bandwidth capability, such as for instance being capable of carrying RF signals with high signal integrity from 3 GHz all the way down to 600 MHz. For example, electrical circuits used for impedance matching and/or amplification within the feedback RoF connection may have optimum performance over a narrow RF bandwidth. Accordingly, embodiments utilize a preferred RF feedback frequency range (for example from 800 MHz to 2 GHz). Accordingly some embodiments up-convert (also known as upshift) a low frequency RF downlink signal, such as a 600 MHz signal, to be within a preferred RF feedback frequency range.

Accordingly the embodiments illustrated in FIGS. 3-7 provide feedback paths with higher signal integrity than their respective downlink path, without requiring more expensive RoF components. The inventor has recognized that the performance of the RoF feedback connection can depend on the frequencies transmitted through the RoF link, and hence the RF downlink operating frequency (i.e., the over-the-air transmission frequency) may not be an optimal frequency having least impairment. In other words, an RoF link, especially one with less expensive components, may have a better performance at preferred frequencies different than the RF downlink transmission frequencies required for over-the-air transmission. Better performance in this context refers to having a higher signal integrity (e.g., introducing less distortion or less noise) at some frequencies than at others. It is envisioned that a preferred frequency for the feedback path would be centered between 0.3 GHz and 3 GHz, with some embodiments utilizing preferred frequencies between 0.8 GHz and 2 GHz.

Therefore, some embodiments utilize a frequency shifter to shift the frequency of the feedback signal to a preferred feedback RF frequency before transmitting the feedback signal through the feedback RoF link. In the embodiments discussed below, such a frequency shifter includes an RF mixer and an RF local oscillator. A frequency shifter may produce a downshifted or upshifted copy of its input signal, or both a downshifted and upshifted copy.

Figure 3:
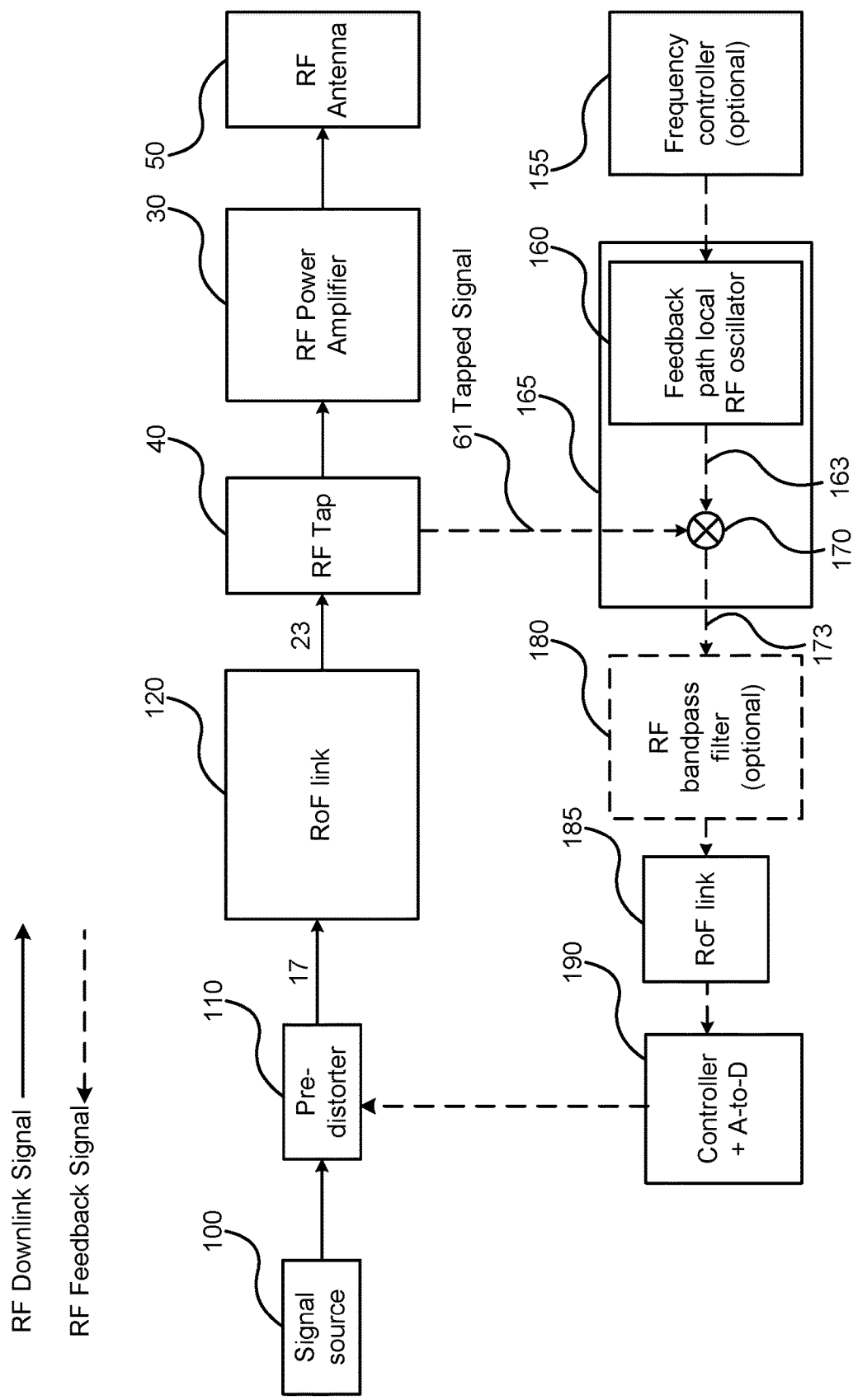
FIG. 3 illustrates an RF system including a feedback path to enable pre-distortion for a system transmitting RF optical signals according to another embodiment of the disclosure.

FIG. 3 illustrates an RF system including a feedback path utilizing a frequency shifter to enable pre-distortion for a system transmitting RF optical signals according to another embodiment of the disclosure. FIG. 3 illustrates an RF signal source 100 separate from the pre-distorter 110. It should be appreciated that this separation is not required and the pre-distorter 110 and the signal source 100 can be integrated into a single node. The signal source 100 is configured to produce an RF signal at a transmission frequency utilized by wireless network. The output from the pre-distorter 110 is an analog electrical RF signal 17, which is converted to an optical RF signal for optical transmission over an optical transmission path such as an Analog Radio over Fiber (RoF) link 21. After transmission over the length of the RoF link 21, the RoF link 21 converts the optical signal into an analog electrical RF signal 23. Analog electrical RF signal 23 is then amplified by the RF power amplifier 30 for wireless transmission via RF antenna 50. A portion 61 of the analog electrical RF signal 23 is supplied to a feedback path via RF analog tap 40. The tapped signal 61 in FIG. 3 is supplied to a frequency shifter 165 for changing the frequency of the feedback signal. In the embodiment illustrated the frequency shifter 165 includes a mixer 170 and a feedback path local RF oscillator 160. Accordingly the mixer 170 mixes the tapped signal 61 with the oscillator frequency 163 to produce a feedback signal 173 which is at a different frequency than the transmission frequency. The frequency shifter 165 is configured (e.g., by selecting the frequency of the oscillator 160) to produce feedback signal 173 at an RF frequency less susceptible to impairments (which can be introduced during optical transmission by the RoF 185) than the transmission frequency. Depending on the transmission frequency, the frequency shifter 165 can be configure to up-convert or down-convert the tapped signal 61 to produce the appropriate feedback signal 173. Feedback signal 173 is transmitted by means of a feedback path RoF link 185, by conversion to an optical RF signal for optical transmission over a fiber optical waveguide before being converted back to an analog electrical RF signal. The output from the RoF link 185 is supplied to a controller 190 which sends control signals to the pre-distorter 110 for adjusting the amount of distortion added by the pre-distorter 110 to compensate for the distortion/impairments introduced over the RoF link 120. If pre-distorter 110 is a DSP or otherwise uses digital pre-distortion, the controller 190 can also include an A-to-D converter as shown. It is noted that the A-to-D converter need not be integrated with the controller and can be a separate component. Furthermore, in some embodiments the controller 190 can be integrated with the pre-distorter 110. The feedback path can optionally include a frequency controller 155 and an RF bandpass filter 180. The frequency controller is used to facilitate the use of different transmission frequencies. This can be useful for manufacturing and inventory control, as the same system can be configured to support different transmission frequencies. This can also be useful for allowing a common feedback path to support wireless networks which support multiple transmission frequencies simultaneously or at different times as will be discussed below. The use of the RF bandpass filter 180 will also be discussed below.

It is noted that in FIG. 3, the tap is located in between the RoF link 21 and the RF power amplifier 30. This implies that the feedback path provides feedback on distortion introduced by the RoF link 21, allowing the pre-distorter to compensate for the distortion added by the RoF link 21. The distortion added by the RoF link depends on such factors as the length of the RoF link, the frequencies used, and the type of components within the RoF link. The more distortion added, the more important it is to correct for this distortion by providing feedback to the pre-distorter for the amount of distortion added by the RoF link 21.

The frequency of the RF local oscillator 160 may be adjusted by a control signal from frequency controller 155 such that the mixer 70 output signal lies within the preferred feedback RF frequency range (i.e., a frequency range for a signal which will pass through the RoF 185 with high signal integrity).

Figure 4A:
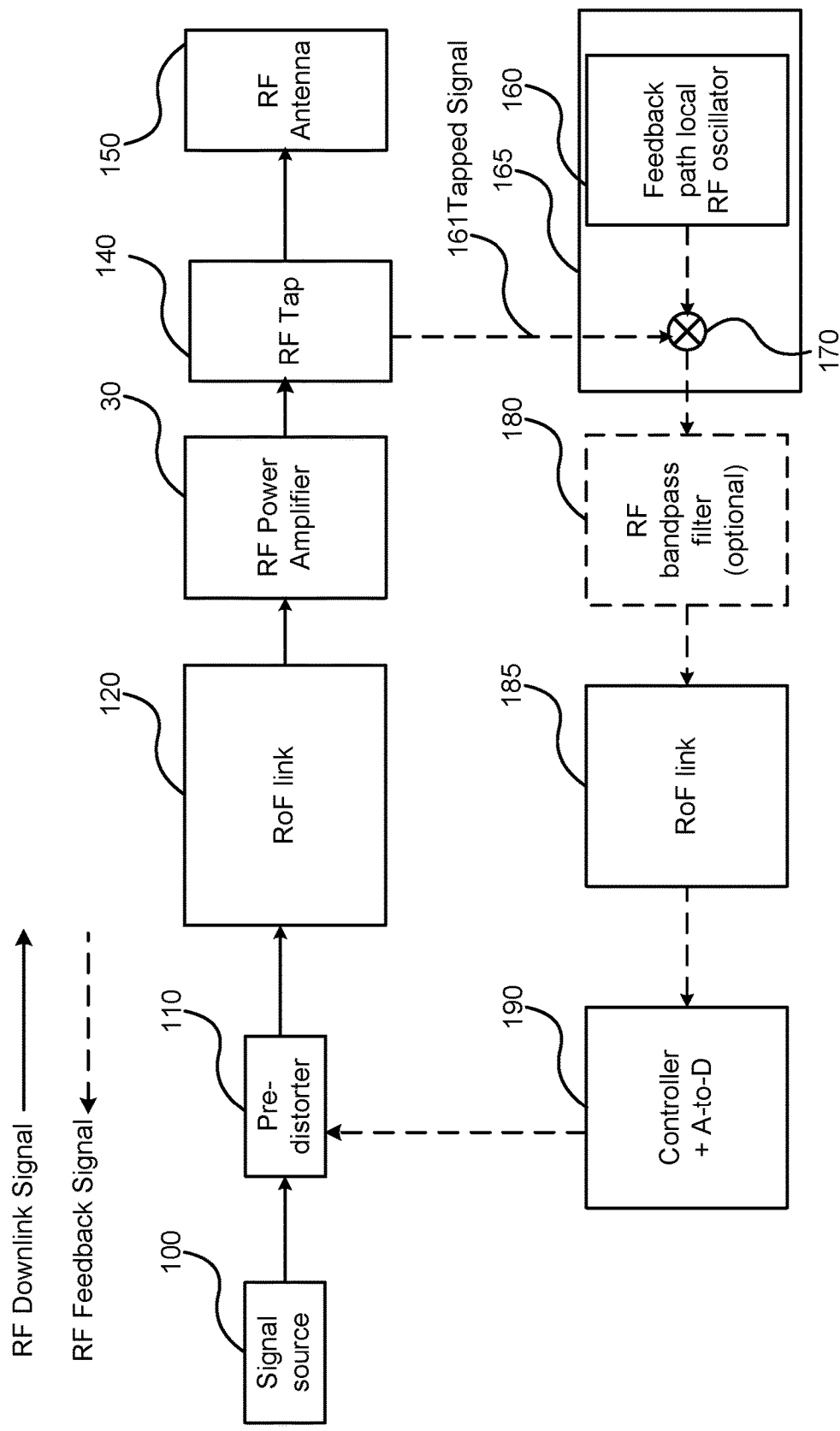
FIGS. 4a and 4b illustrates additional RF systems including a feedback path to enable pre-distortion for a system transmitting RF optical signals according to other embodiments of the disclosure.
Figure 4B:
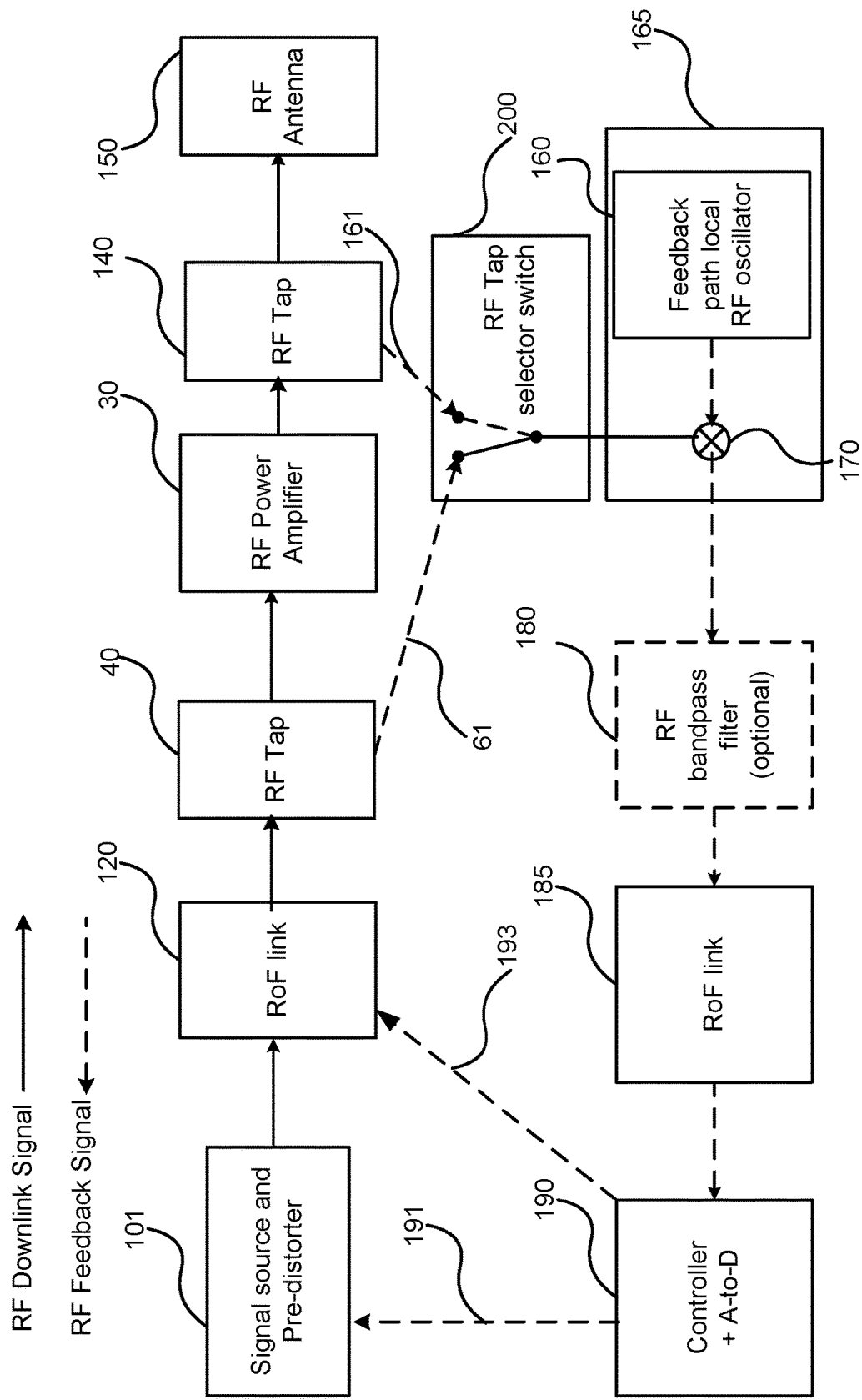

FIGS. 4A and 4B illustrate RF systems including a feedback path utilizing a frequency shifter to enable predistortion for a system transmitting RF optical signals according to embodiments of the disclosure. Unlike FIG. 3, both FIGS. 4A and 4B include an RF analog tap 140 to tap the RF signal after amplification by the RF Power Amplifier. Accordingly both FIGS. 4A and 4B allow for feedback paths to compensate for distortion introduced both by the RoF link 120 and the RF power amplifier 30. In the case of the embodiment illustrated in FIG. 4A, an RF signal source 100 produces an RF signal at a transmission frequency which is pre-distorted by pre-distorter 110. It should be appreciated the pre-distorter 110 and the signal source 100 can be integrated into a single element. The signal source 100 is configured to produce an RF signal at a transmission frequency utilized by wireless network. The output from the pre-distorter 110 is an analog electrical RF signal 17, which is converted to an optical RF signal for optical transmission over an optical transmission path such as an RoF link 120. After transmission over the length of the RoF 120, the RoF 120 converts the optical signal into an analog electrical RF signal. The analog electrical RF signal is then amplified by the RF power amplifier 30 for wireless transmission via RF antenna 50. A portion 161 of the amplified electrical RF signal is supplied to a feedback path via RF analog tap 140. The tapped signal 161 in FIG. 4A is supplied to a frequency shifter 165 for changing the frequency of the feedback signal. In the embodiment illustrated the frequency shifter 165 includes a mixer 170 and a feedback path local RF oscillator 160 which produces a local oscillator frequency. Accordingly the mixer 170 mixes the tapped signal 161 with the oscillator frequency 163 to produce a feedback signal which is at a different frequency than the transmission frequency. The frequency shifter 165 is configured (e.g., by selecting the frequency of the oscillator 160) to produce a feedback signal at an RF frequency less susceptible to impairments (which can be introduced during optical transmission by the RoF 185) than the transmission frequency. Depending on the transmission frequency, the frequency shifter 165 can be configure to up-convert or down-convert the tapped signal 161 to produce the appropriate feedback signal. The feedback signal is converted to an optical RF signal for optical transmission over a fiber optical waveguide before being converted back to an analog electrical RF signal by a feedback path RoF link 185. The output from the RoF link 185 is supplied to a controller 190 which sends control signals to the pre-distorter 110 for adjusting the amount of distortion added by the pre-distorter 110 to compensate for the distortion/impairments introduced over the RoF link 120. If pre-distorter 110 is a DSP or otherwise uses digital pre-distortion, the controller 190 can also include an A-to-D converter as shown. It is noted that the A-to-D converter need not be integrated with the controller and can be a separate component. Furthermore, in some embodiments the controller 190 can be integrated with the pre-distorter 110. The feedback path can optionally include a frequency controller 155 and an RF bandpass filter 180. Note that while not shown in FIG. 4A, it should be appreciated that the optional frequency controller 155 can also be included.

As noted, the feedback signal in FIG. 4A can be used to compensate for the total distortion added both by the RoF link 120 and the RF power amplifier 30. However, as the embodiment illustrated in FIG. 4A only provides feedback from the post amplified signal, there is no mechanism illustrated to differentiate between distortion added by the RoF link 120 and that added by the power amplifier 30. It may be desirable to distinguish these distortion components, such as in a system wherein the pre-distorter comprises an element that can compensate for the distortion of the RoF signal link 120 and another element that can compensate for the distortion of the RF power amplifier 30. It may also be useful to distinguish these distortion components in a fault localization system where it is desirable to distinguish whether a fault is in the RoF signal link 120 or the RF power amplifier 30. FIG. 4B illustrates an embodiment including both the tap 40 (from FIG. 3), which is located before the RF power amplifier 30, as well as the tap 140 (from FIG. 4A), which is located after the RF power amplifier 30. The embodiment illustrated in FIG. 4B includes an RF tap selector switch which can switch between coupling the pre amplifier tapped signal 61 or the post amplifier tapped signal 161 to the frequency shifter 165. This allows the controller 190 to receive either feedback signal, and control the pre-distorter to compensate for distortion introduced by the RoF link 120 separate from the distortion added by the RF power amplifier 30. Note that the RF power level in the signal at the RF tap 40 may be different than the RF power level at the RF tap 140, and that this difference may be larger than the dynamic range of the RF tap selector switch 200, the mixer 170 or the RoF feedback link 185. Accordingly, the fraction of power tapped by respective taps 40, 140 may differ, or there may be RF amplifiers or RF attenuators (not shown) after taps 40, 141 and before RF tap selector switch 200, mixer 170 or RoF feedback link 185, to minimize the dynamic range requirements. The selector switch 200 can be configured to switch between the two inputs 61, 161 in some time domain switching manner, such as time division duplexing. In some embodiments the controller 190 can control the switching of selector switch by a control signal (not shown). The controller 190 can use the feedback to control the compensation added by the pre-distorter via control signal 191. In some embodiments, controller 190 can send a control signal 193 to the laser of the RoF link 120 to fine tune the output of the RoF link's laser (for example by adjusting its modulation amplitude, bias current or wavelength) in response to impairments added by the RoF link 120, as revealed by the feedback from tap RF 40. It should be appreciated that such a control signal 193 can also be used for the embodiments illustrated in FIGS. 2, 3, 4A, 5, 6 and 7.

Figure 5:
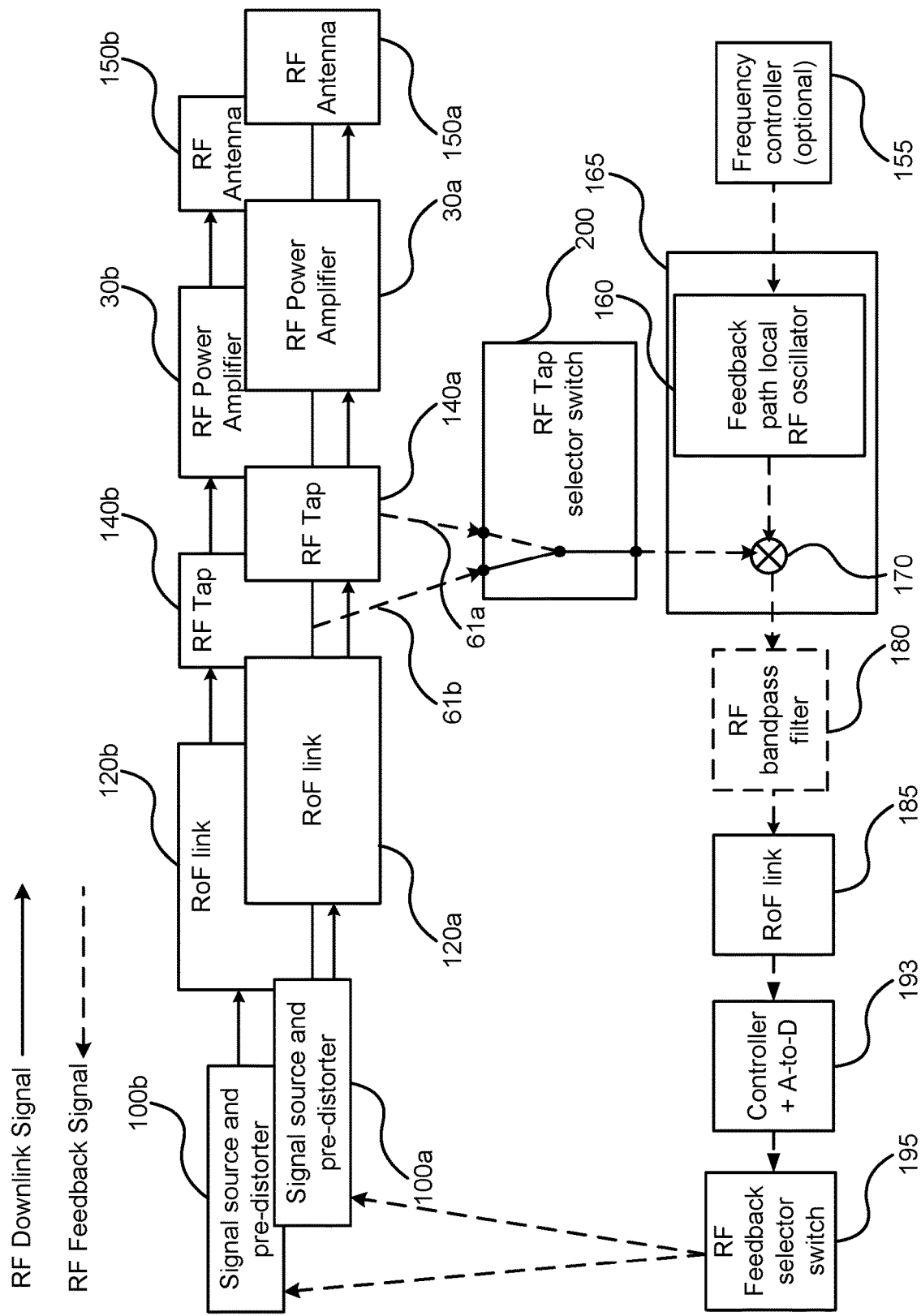
FIG. 5 illustrates an RF system including a feedback path to enable pre-distortion for a system transmitting multiple RF optical signals according to another embodiment of the disclosure.

FIG. 5 illustrates an RF system including a feedback path to enable pre-distortion for a system transmitting multiple RF optical signals according to another embodiment of the disclosure. To enable flexibility of deployment, such a system can carry a wide range of RF signal frequencies, such as the 600 MHz and near-5 GHz channels identified by the 3GPP standards organization for use with 5G wireless. FIG. 5 illustrates a system with first and second downlink paths and a shared feedback path. While only two downlink paths are illustrated, it should be appreciated that additional downlink paths can be utilized. Accordingly the first downlink path includes a first signal source and pre-distorter unit 100a, a first downlink RoF 120a, a first RF tap 140a producing tapped signal 61a, a first RF power amplifier 30a and a first RF antenna 150a. The second downlink path includes a second signal source and pre-distorter unit 100b, a second downlink RoF link 120b, a second RF tap 140b producing tapped signal 61b, a second RF power amplifier 30b and a second RF antenna 150b. In some embodiments some components can be shared between the two downlink paths. For example, in some embodiments the two downlink paths can share a common RF power amplifier and/or common RF antenna. The feedback path a frequency shifter 165 (in this example including local oscillator 160 and RF mixer 170), a feedback RoF link 185, a controller 193 and an RF feedback selector switch 195 for routing a control signal from the controller to either the pre-distorter of the first path 100*a* or the pre-distorter of the second path 100*b*. The feedback path also includes an RF tap selector switch 200 for routing one of the two tapped signals (61*a*, 61*b*) to the frequency shifter 165. Both switches 200, 195 can operate together using time domain switching such that feedback from the first path is sent to the first path half of the time and feedback from the second path is sent to the second path for the other half of the time. In some embodiments, one or more of the frequency controller 155 and/or the RF bandpass filter 180 can be used. For example if the first transmission frequency (i.e., the transmission frequency of the first path) differs from the second transmission frequency (i.e., the transmission frequency of the second path), then frequency controller 155 can configure the frequency shifter (e.g., the frequency of the oscillator 160) such that the feedback frequency is within a preferred feedback frequency range regardless of the different transmission frequencies. In some embodiments, the feedback frequency is the same for different transmission frequencies, whereas in other embodiments the feedback frequency is different for different transmission frequencies, provided the feedback frequency is within the preferred feedback frequency range. Also it should be noted that while a feedback frequency (or transmission frequency) is discussed, a signal will have a carrier frequency at the feedback frequency (or transmission frequency) and a modulation bandwidth frequency range proximate to the carrier frequency in the frequency domain. Accordingly the term feedback frequency should be interpreted as having a carrier frequency at the feedback frequency.

It is noted that in FIG. 5, the RF analog taps 140*a*, 140*b* are located between the RoF link and the RF power amplifier. It is noted that the RF tap can alternatively be located after the power amplifier, or an arrangement like that illustrated in FIG. 4B can be used.

In an embodiment, the RF emission frequency is flexible, and can be changed according to the requirements of an RF network operator. In some cases the RF emission frequency produced by signal source 100 is already at a frequency that does not need to be shifted to achieve high signal integrity on the RF feedback path. Accordingly in some embodiments an RF bypass switch (such as the bottom half of the tap selector switch 300, along with mixer bypass switch 220) is used to bypass the RF mixer when the system is configured to operate at a transmission frequency (e.g., 800 MHz) which does not require frequency shifting of the feedback signal. This can be useful to allow a network to be designed for example to include one downlink path during startup and add a second downlink path at a future date. It also allows an equipment provider to manufacture, sell and inventory a single system which can satisfy a variety of network operator requirements.

Figure 6:
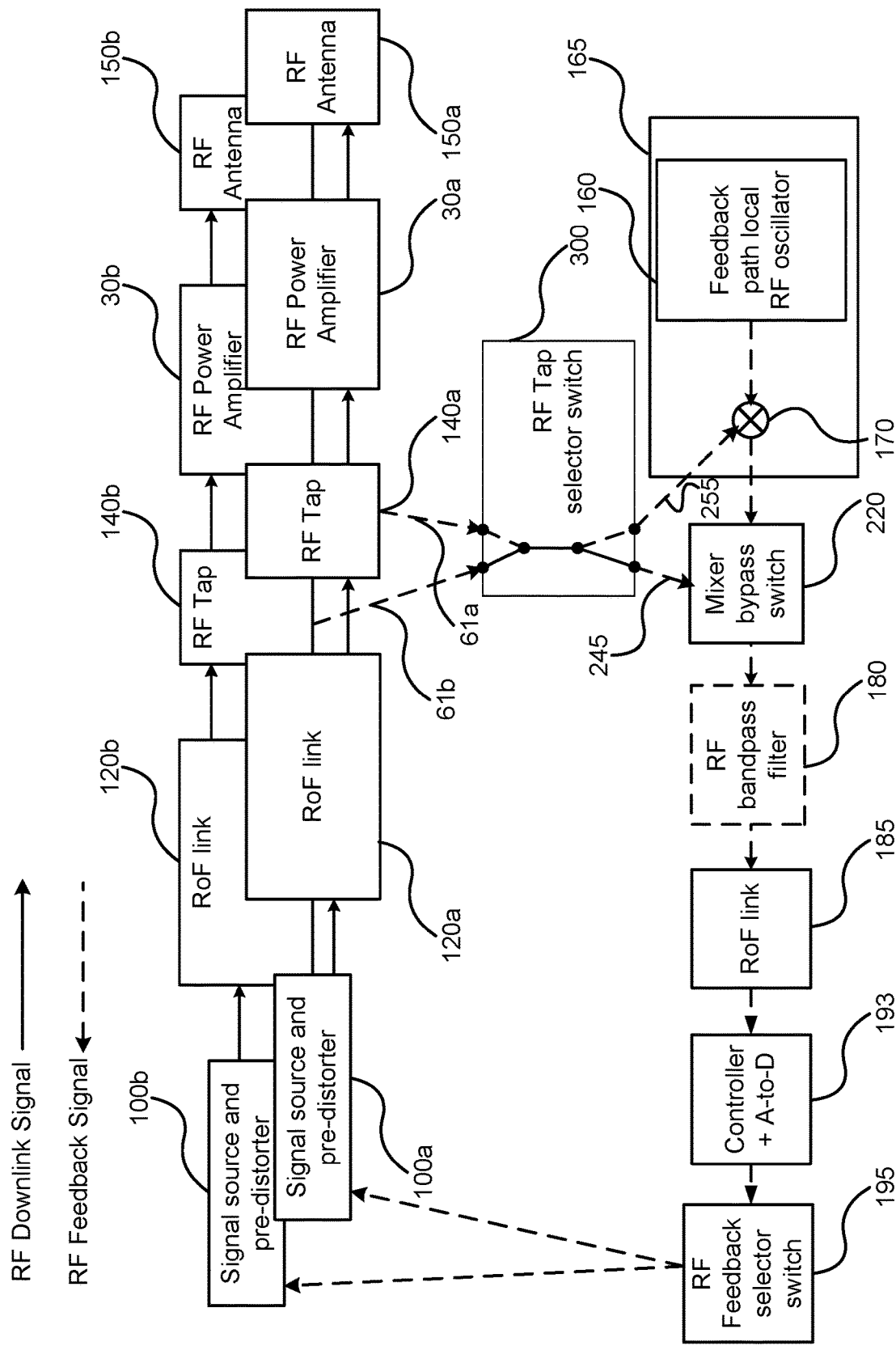
FIG. 6 illustrates an RF system including a feedback path to enable pre-distortion for a system transmitting multiple RF optical signals each using different frequencies according to another embodiment of the disclosure.

FIG. 6 illustrates an RF system including a feedback path to enable pre-distortion for a system transmitting multiple RF optical signals each using different frequencies according to such an embodiment. FIG. 6 is similar to FIG. 5, except it is best used for situations where one of the downlink paths is already at a suitable frequency for the feedback path, and therefore does not require frequency shifting. Due to the similarity with FIG. 5, only differences will be discussed. The main difference is the RF tap selector switch 300 is configured so that either feedback signal 61*a*, 61*b* can be routed to one of two positions 245, 255. Link 245 is used if the transmission frequency does not require up or down conversion, as it is already at a frequency (e.g. 800 MHz) subject to low impairments as an optical signal traverses the RoF feedback link 185. Link 245 connects the feedback signal to mixer bypass switch 220 which forwards the feedback signal to the RoF feedback link 185 while bypassing the mixer 170 of frequency shifter 165. Link 255 is used if the transmission frequency (e.g., 5 GHz) requires up or down conversion to shift the frequency of the feedback signal to a preferred frequency which will suffer fewer impairments than the transmission frequency for an optical signal traversing the RoF link 185. Accordingly link 255 connects the feedback signal to the mixer 170 of frequency shifter 165 for up or down conversion to a more suitable feedback frequency. It should be noted that in other embodiments, the frequency shifter can be configured to not alter the frequency, for example by temporarily turning off or disconnecting the oscillator 160. In such a case the mixer bypass switch 220 can be omitted, and the switch of FIG. 5 can be used.

Note that while not shown in FIG. 6, it should be appreciated that the optional frequency controller 155 can also be included. Also, once again the RF tap can alternatively be located after the power amplifier, or an arrangement like that illustrated in FIG. 4B can be used.

In an embodiment, the cell tower has a desired RF transmission frequency of very high RF frequency (e.g. microwave or millimeter-wave frequencies of >20 GHz) that is very challenging to transmit over an RoF connection. In this case, the RF downlink signal frequency is originally produced at an RF intermediate frequency which is a lower frequency than the RF transmission frequency. The embodiment is similar to the other embodiments, except that there is an additional mixer in the signal path to upshift the RF downlink signal frequency (which is at an RF intermediate frequency) to the desired RF emission frequency.

Figure 7:
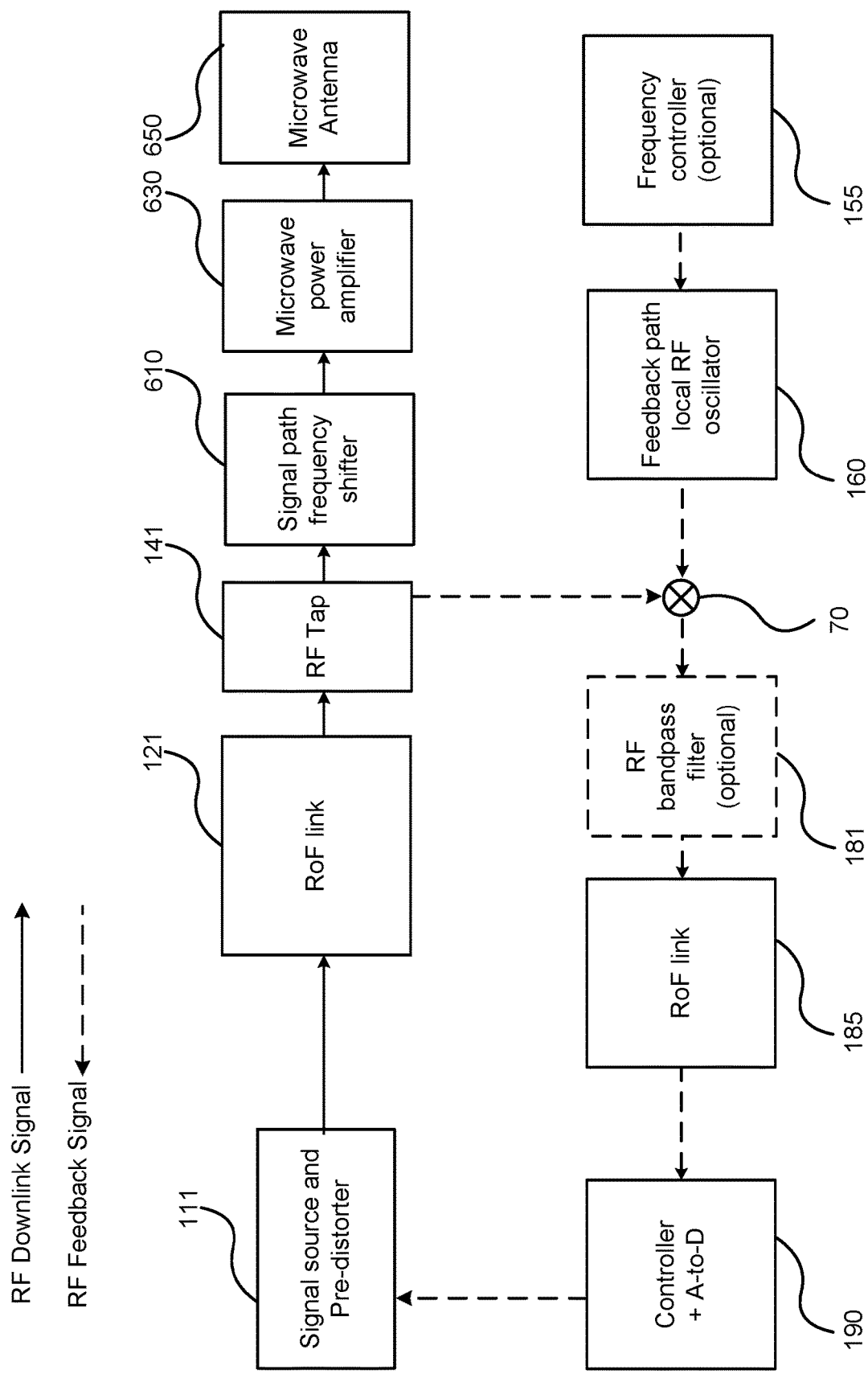
FIG. 7 illustrates an RF system including a feedback path to enable pre-distortion for a system transmitting RF optical signals for microwave transmission according to another embodiment of the disclosure.

FIG. 7 illustrates an RF system including a feedback path to enable pre-distortion for a system transmitting RF optical signals for microwave transmission according to such an embodiment. FIG. 7 includes a downlink path frequency shifter 610 located after the analog tap 141 for upconverting the electrical RF signal to a signal of transmission frequency 10 GHz or higher for microwave or millimeter wave transmission. FIG. 7 also includes a microwave power amplifier 630 and microwave antenna 650. It is noted that that the downlink path includes a signal source 111, RoF link 121 using different numbers than that of the corresponding components of FIGS. 3 and 4 to indicate that the RF signal used may be at an intermediate frequency. Such an intermediate frequency is chosen such that it can be transmitted with sufficient fidelity over the RoF link 121, and both upconverted by frequency shifter 610 and also down converted by the feedback frequency shifter (including mixer 70 and feedback oscillator 160) without either mixer adding an unacceptable amount of distortion at a reasonable cost. Alternatively, the tap 141 of FIG. 7 may be placed after the microwave power amplifier 630, in a manner analogous to the tap 140 of FIG. 4*a* which is placed after the RF power amplifier 30. In such case, the mixer 70 shifts the tapped signal from the microwave frequency to the feedback frequency.

It should be appreciated that during the above discussion, while the terms transmission frequency and feedback frequency have been used, each signal will have signal center frequency and a signal bandwidth. An ideal frequency shifter would shift the center frequency and the signal bandwidth would shift accordingly. However in practice a frequency shifter can add unwanted power in the upper and lower sidebands of the signal bandwidth. The optional RF bandpass filter can filter out such unwanted distortion. Furthermore, in practice a frequency shifter will produce both sum and difference signals (resulting from adding the tapped signal with the oscillator signal and subtracting the two).

and the difference signal 710 is sent, effectively down-converting to 2 GHz. Accordingly the bandpass filter has a bandpass 720 to allow the difference signal 710 to be transmitted on the RoF link, whereas the sum frequency 740 (at around 8 GHz) is blocked by the bandpass filter.

TABLE 1

| Case | Preferred frequency of feedback channel | Signal frequency | LO frequency | Difference \|f_signal − f_LO\| | Sum f_signal + f_LO | Which frequency is sent on the feedback channel | Order of frequencies low to high |
|---|---|---|---|---|---|---|---|
| A | 2.0 | 5.0 | 3.0 | 2.0 | 8.0 | Difference | Difference, LO, signal, sum |
| B | 2.0 | 0.5 | 1.5 | 1.0 | 2.0 | Sum | Signal, difference, LO, sum |
| C | 2.0 | 1.5 | 0.5 | 1.0 | 2.0 | Sum | LO, difference, signal, sum |
| D | 2.0 | 1.5 | 3.5 | 2.0 | 5.0 | Difference | Signal, difference, LO, sum |

Configurations for the optional RF bandpass filter 180 will now be discussed with reference to examples set out in Table 1 and FIGS. 8-15. For each of FIGS. 8-15, the vertical axis is the electrical power spectral density of the frequency shifted signal and the horizontal axis is the frequency of the frequency shifted signal. Further, additional details of an example frequency shifter including a mixer and local oscillator will be discussed with reference to Table 1 and FIGS. 8-11.

The following discussion assumes the local oscillator (LO) is at a nominally single frequency, known as the LO frequency, although in other embodiments a spread spectrum oscillator or a time-varying local oscillator can be used. It is also assumed that the tapped signal has a bandwidth, and the preferred feedback frequency is centered around 2 GHz. The signal frequency is whatever frequency the RF transmission system is intended to deliver (e.g., the transmission frequency). The LO frequency is adjusted so that the frequency on the feedback channel is within the preferred feedback frequency band. The difference frequency is the absolute value of the signal frequency minus the local oscillator frequency; the sum frequency is the signal frequency plus the local oscillator frequency.

Figure 8:
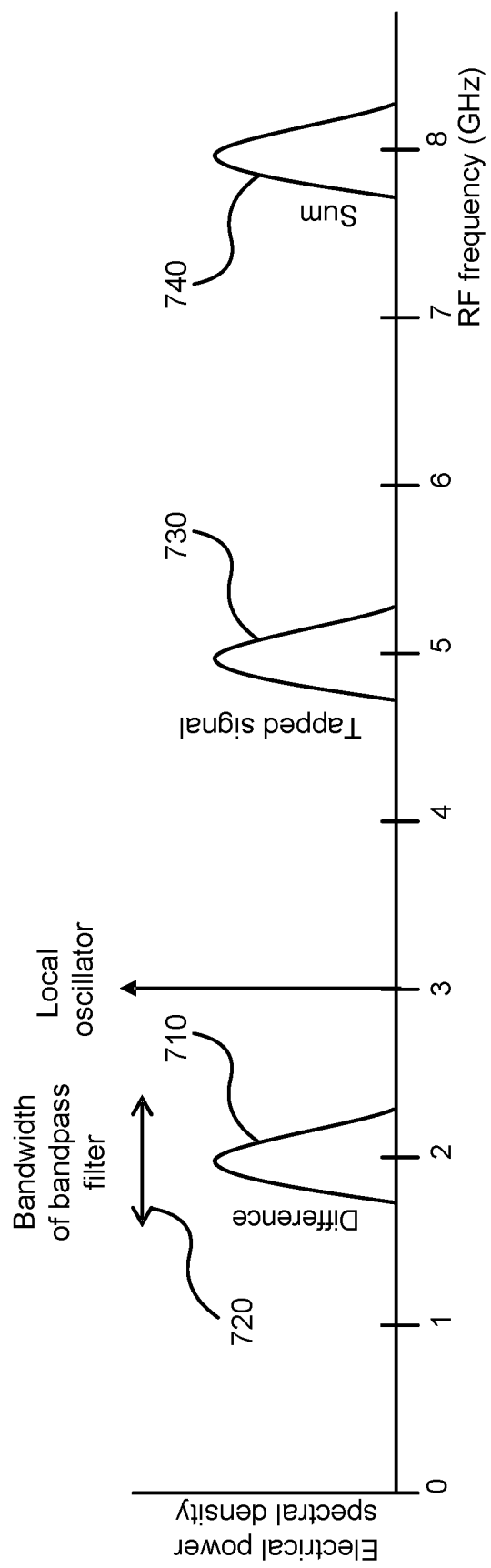
FIGS. 8-11 illustrate cases from Table 1.
Figure 9:
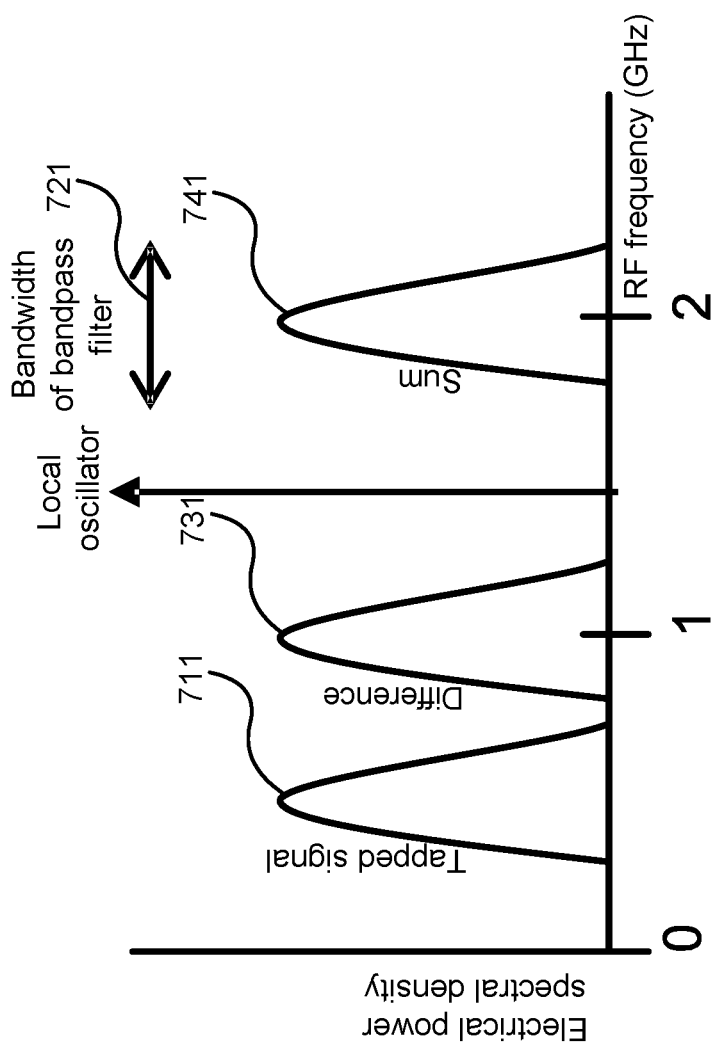
Figure 10:
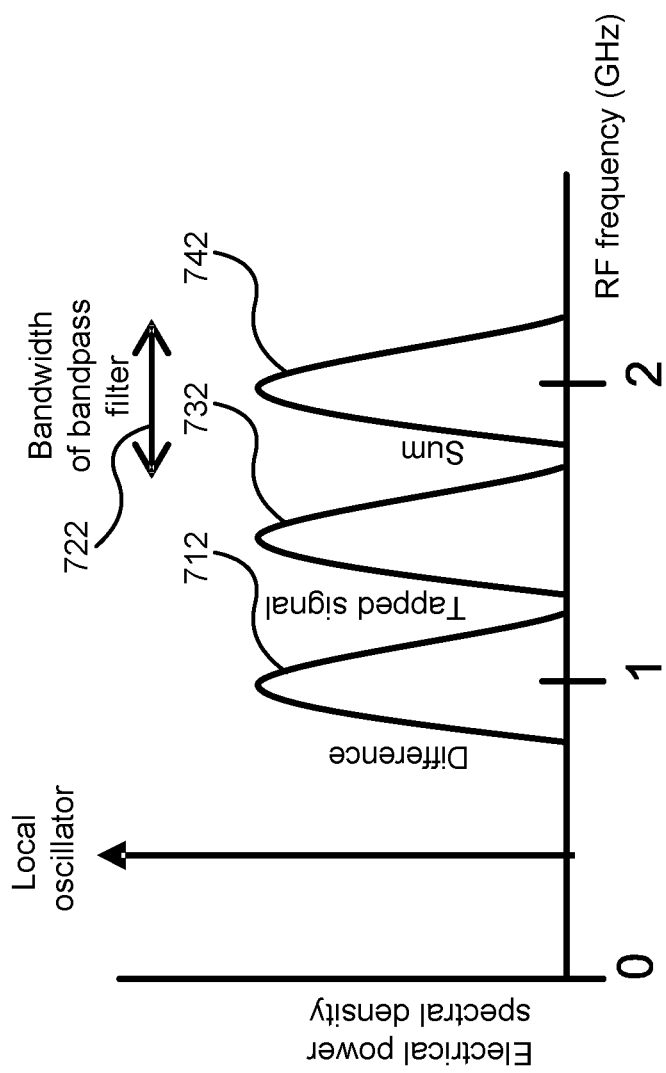
Figure 11:
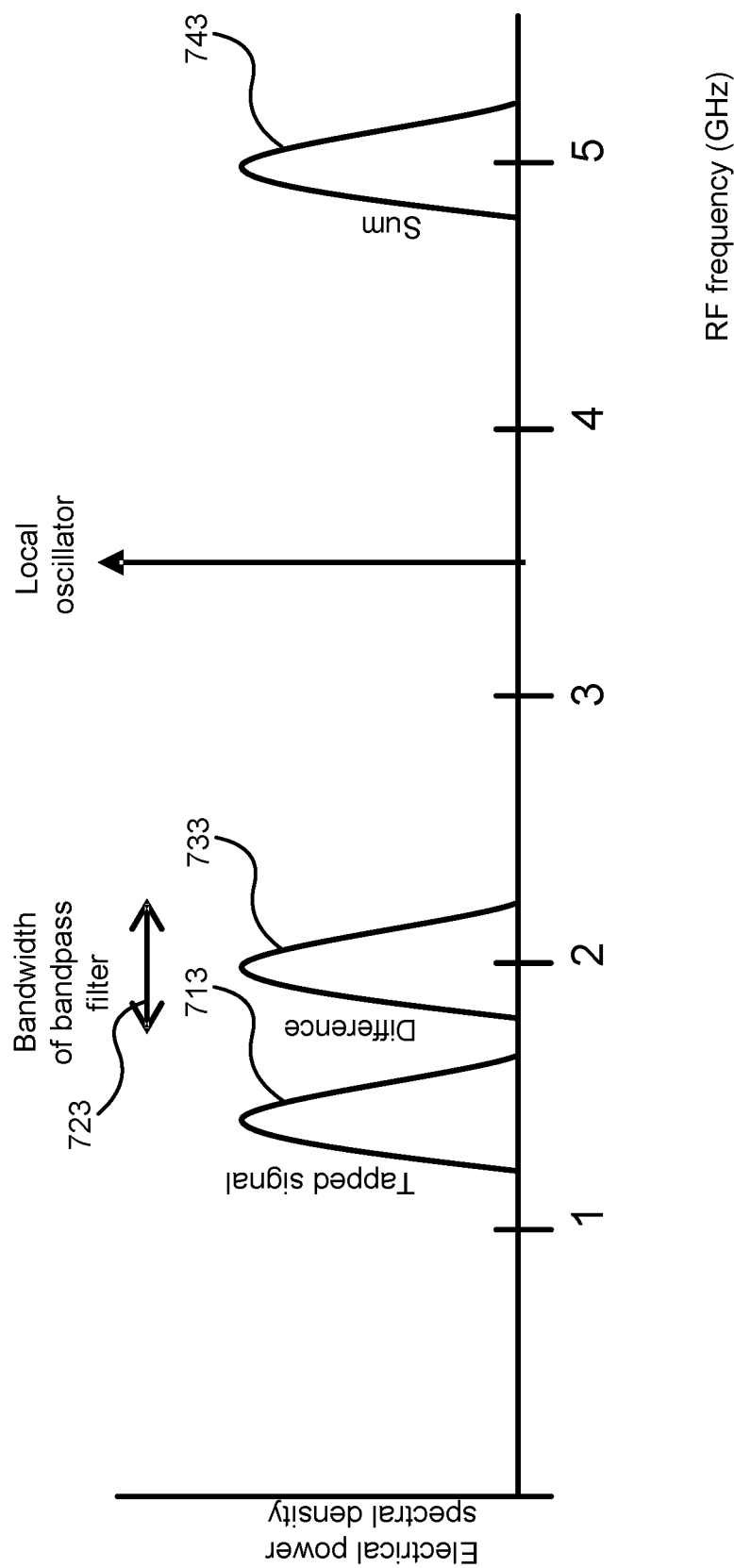

Table 1 illustrates several examples (cases A, B, C and D) of when to upshift or downshift the feedback signal depending on the transmission frequency. The units of Table 1 are GHz. While Table 1 is represented as precise frequencies, it should be understood that in practice the preferred feedback frequency has a range, and thus for a given signal frequency, the LO frequency has an acceptable range. The final column of Table 1 indicates the relative value of the frequencies in the system. It will be seen from the examples that the choice of whether to send the difference frequency or the sum frequency in the feedback path depends upon the relative value of the frequencies. It will also been seen that the LO frequency must be selected such the sum or difference frequency lies within the preferred feedback frequency feedback band. FIG. 8 illustrates case A, FIG. 9 illustrates Case B, FIG. 10 illustrates case C and FIG. 11 illustrates Case D, according to embodiments of the disclosure. FIG. 8 and Table 1 illustrate that for case A having tapped signal 730 at 5 GHz, a local oscillator frequency of 3 GHz is used FIG. 9 and Table 1 illustrate that for case B having tapped signal 711 at 0.5 GHz, a local oscillator frequency of 1.5 GHz is used and the sum signal 741 is sent (effectively up-converting to 2 GHz). Accordingly the bandpass filter has a bandpass 721 to allow the sum signal 741 to be transmitted on the RoF, whereas the difference signal 731 (at around 1 GHz) is blocked by the bandpass filter.

FIG. 10 and Table 1 illustrate that for case C having tapped signal 732 at 1.5 GHz, a local oscillator frequency of 0.5 GHz is used and the sum signal 742 is sent (effectively up-converting to 2 GHz). Accordingly the bandpass filter has a bandpass 722 to allow the sum signal 742 to be transmitted on the RoF, whereas the difference signal 712 (at around 1 GHz) is blocked by the bandpass filter.

FIG. 11 and Table 1 illustrate that for case D having tapped signal 713 at 1.5 GHz, a local oscillator frequency of 3.5 GHz is used and the difference signal 733 is sent, effectively down-converting to 2 GHz. Accordingly the bandpass filter has a bandpass 723 to allow the difference signal 733 to be transmitted on the RoF, whereas the sum frequency 743 (at around 5 GHz) is blocked by the bandpass filter.

An appropriate RF bandpass filter 180 after the mixer may select the appropriate mixer output that is within the preferred RF feedback frequency range. In some embodiments the RF bandpass filter 180 is configurable to allow for appropriate frequency ranges to pass. Alternatively, in other embodiments the RF bandpass filter may be located within or after the RoF feedback link, such as in the laser or photoreceiver of the RoF feedback link, or within the controller or pre-distorter DSP.

Figure 12:
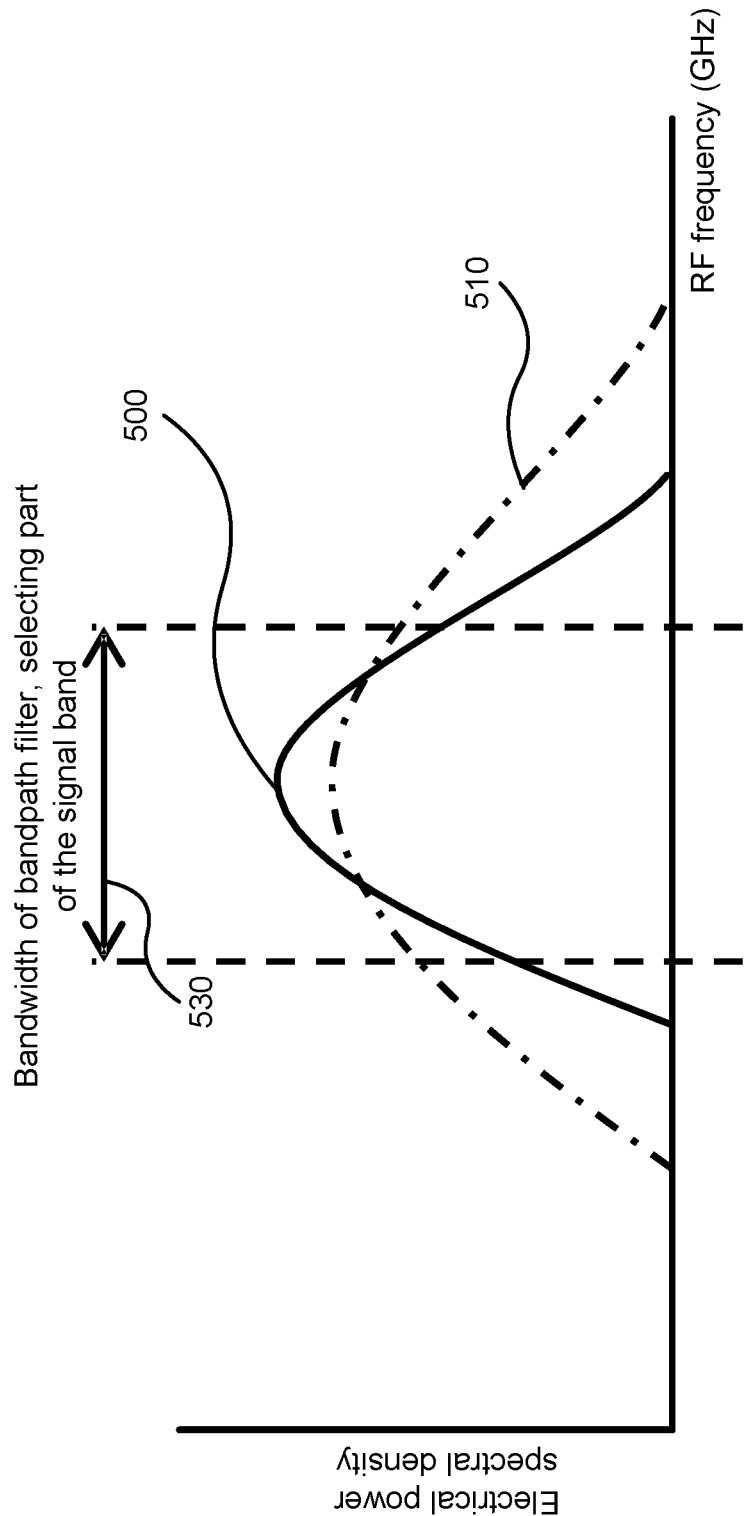
FIGS. 12-15 illustrate possible bandpass filter configurations according to embodiments of the disclosure.
Figure 13:
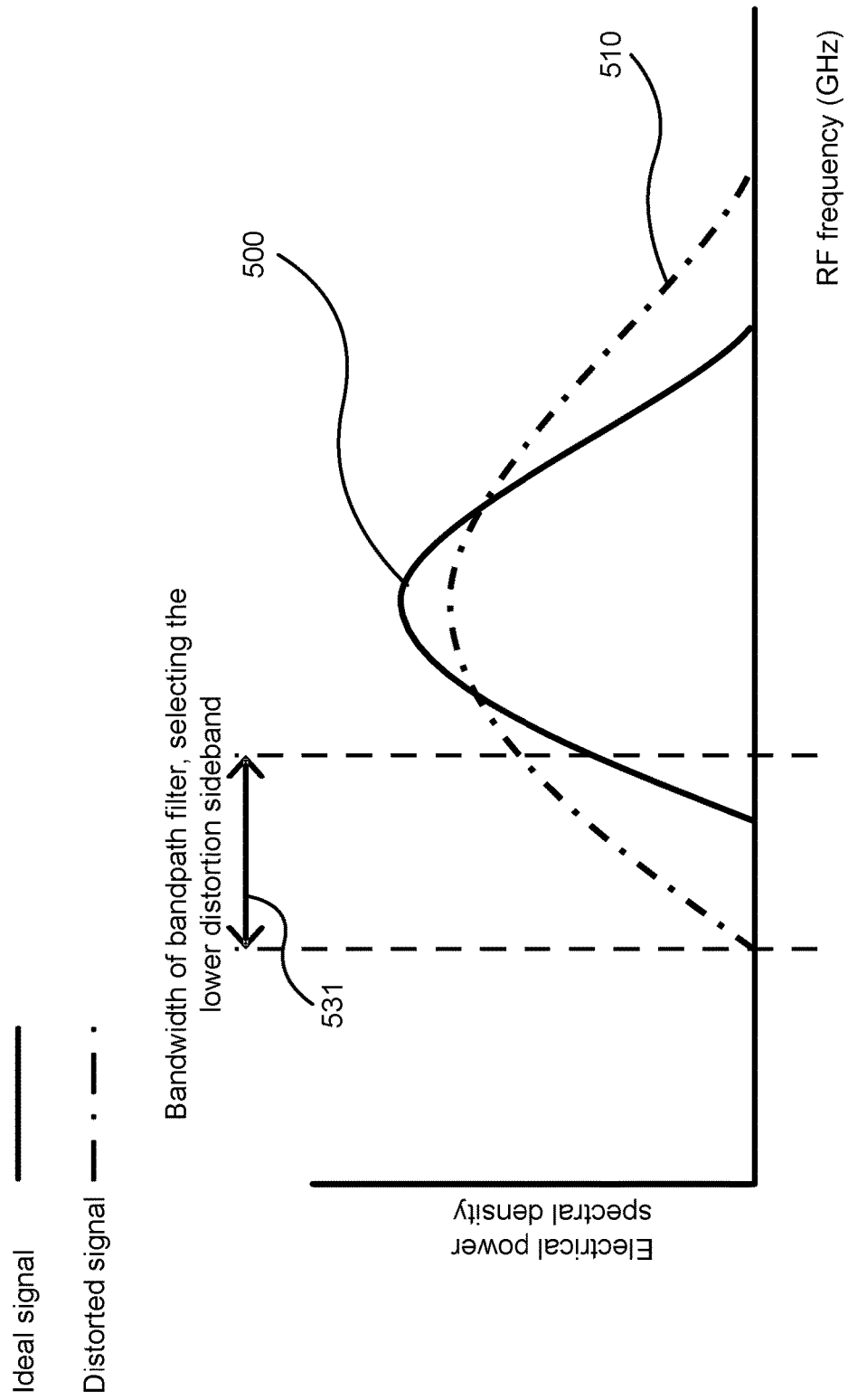
Figure 14:
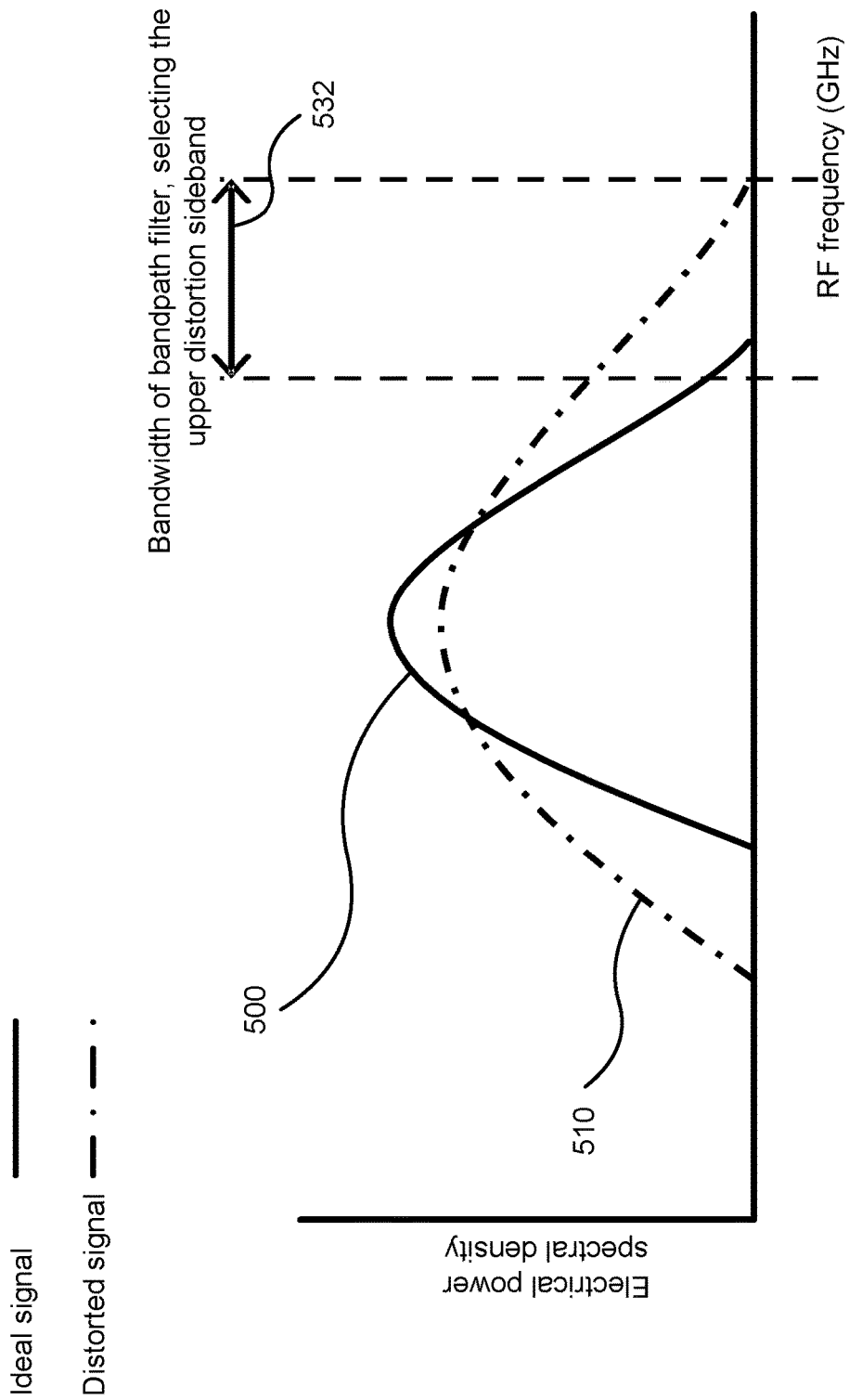
Figure 15:
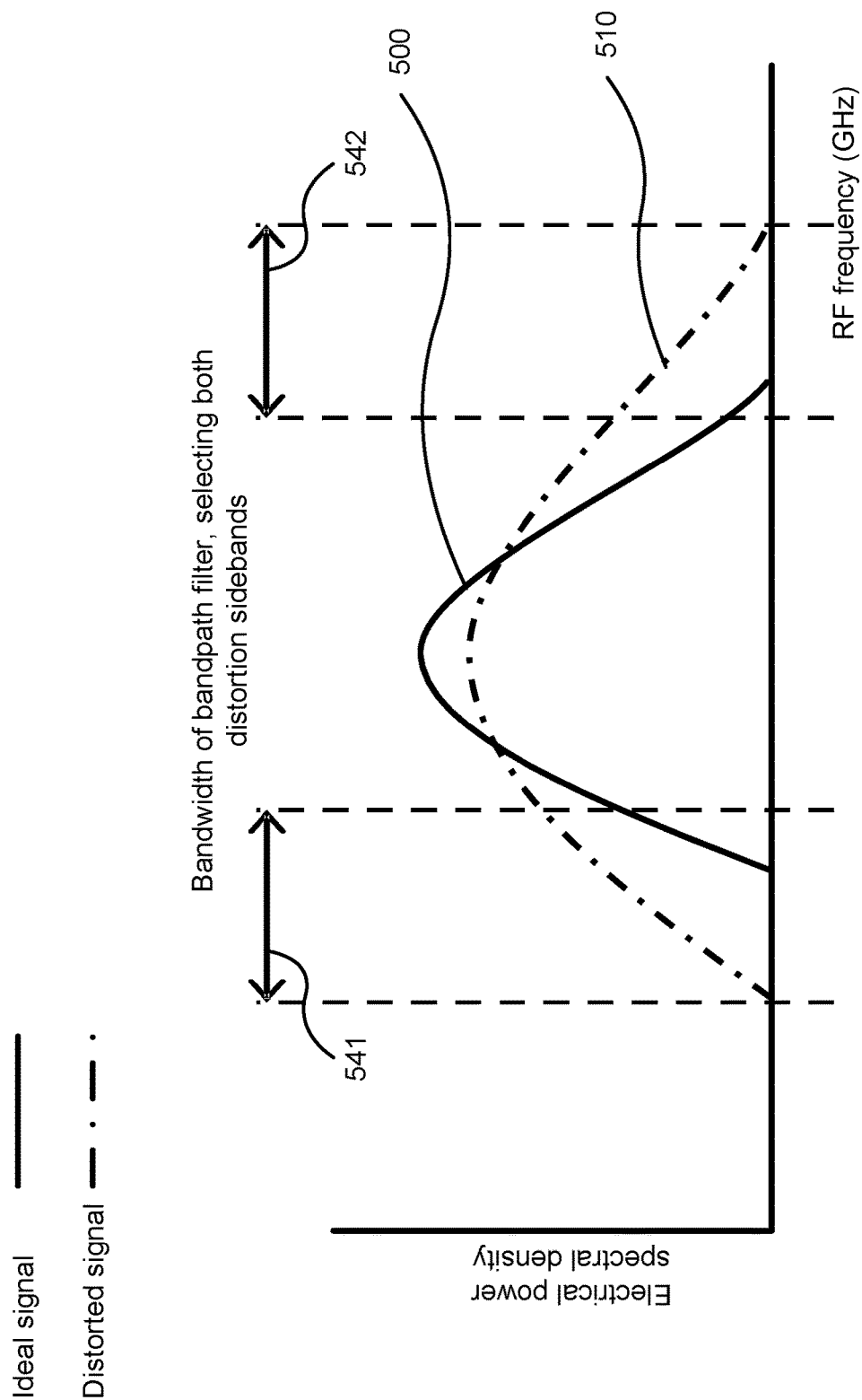

Depending on the pre-distortion algorithm, the pre-distorter may need to be aware of the entire spectrum of the distorted signals, or only one or more portions of the spectrum of the distorted signal. Accordingly, FIGS. 12-15 illustrate additional uses for the bandpass filter, according to some embodiments, depending on the pre-distortion algorithms used. In FIGS. 12-15, curves 500 and 510 represent the signal out of the RF mixer, which in general is a shifted representation of the transmission signal in the signal transmission path after the RoF signal link and/or after the RF power amplifier. Curve 500 (solid line) illustrates the signal spectrum if the transmission signal is good. Dashed and dotted curve 510 illustrate distorted versions of the transmission signal where the distortion is due to impairments in the signal transmission path, with distorted signal 510 having unwanted power in upper and lower distortion sidebands. FIG. 12 illustrates a bandpass filter having passband 530 configured to block the unwanted power in upper and lower distortion sidebands. FIG. 13 illustrates bandwidth 531 of the bandpass filter, selecting the lower distortion sideband, which can be useful for pre-distortion techniques which attempt to minimize distortions added in the lower distortion band. FIG. 14 illustrates bandwidth 532 of bandpath filter, selecting the upper distortion sideband, which can be useful for pre-distortion techniques which attempt to minimize distortions added in the upper distortion band. FIG. 15 illustrates a bandwidth filter having two pass bands 541, 542 for selecting the lower and upper distortion sidebands respectively, which can be useful for pre-distortion techniques which attempt to minimize distortions added in both distortion bands.

In some embodiments the RoF feedback connection and the RoF downlink connection can be carried on the same fiber. In this case, there is a further advantage when the RF feedback signal has a different RF frequency than the RF downlink signal. It is known that two RF signal in the same fiber may leak into each other, such as by parasitic optical reflections or RF crosstalk. However in these embodiments, the RF downlink signal may be readily separated from such leakage by means of RF frequency filtering at the processing location.

As discussed above, an RoF can introduce impairments at a transmission frequency which are significant higher than at a preferred feedback frequency. For example, it is contemplated that comparing the impairments introduced for a feedback frequency of 1 GHz compared to a transmission frequency of 5 GHz can result in improved dynamic range of the feedback channel by 3 to 5 dB. For example it is contemplated that Laser RF-to-optical conversion can be approximately 2 dB better at 1 GHz compared to 5 GHz. Similarly it is contemplated that Laser RIN can be approximately 3 dB better. Laser third-order linearity can be approximately 3 dB better (known as the third-order intercept parameter, IIP3). Similarly a calculated fiber dispersion penalty for a 20 km RoF link can be approximately 3 dB better (calculated, using chirp of directly modulated laser).

Figure 16:
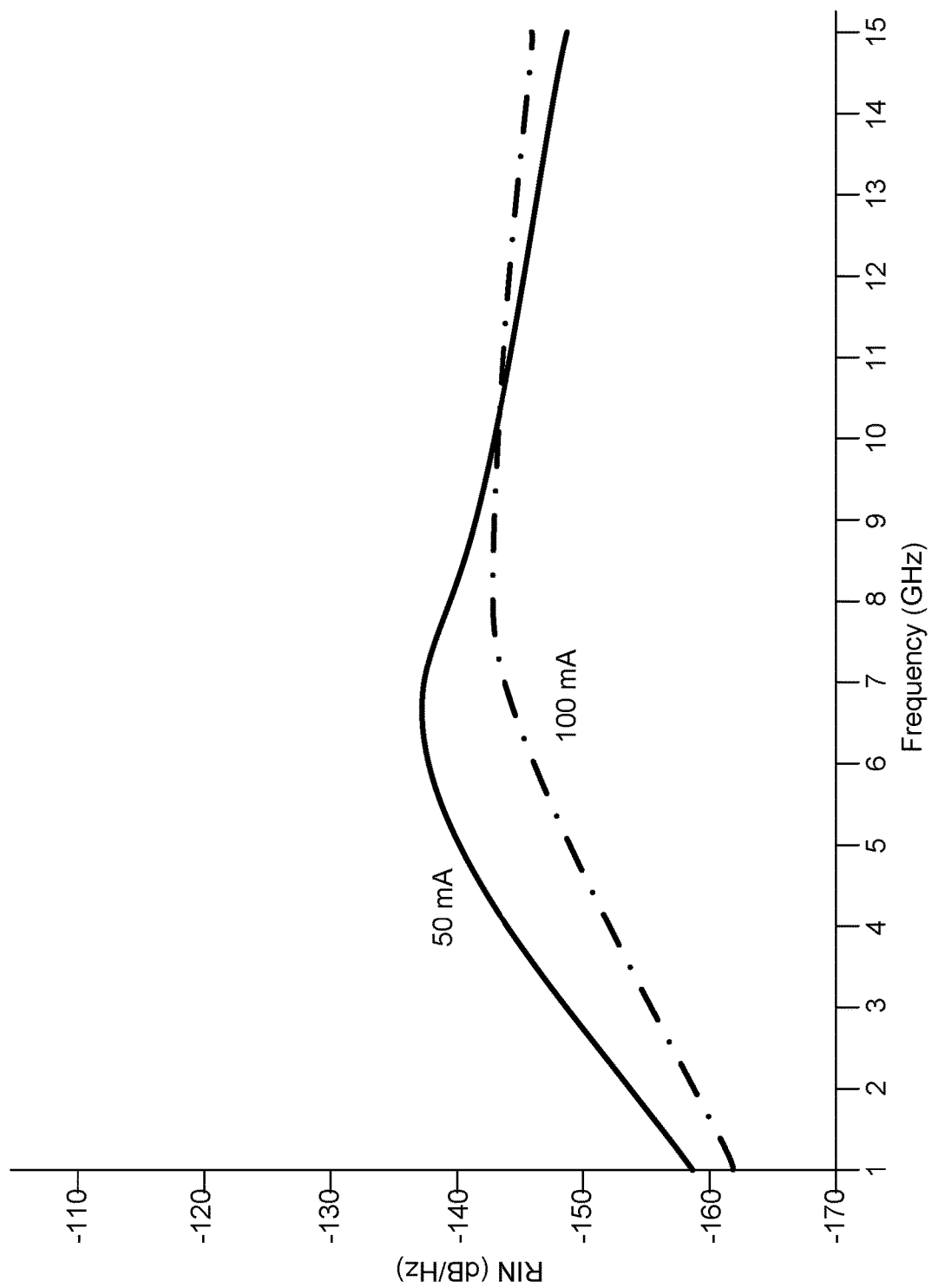
FIG. 16 illustrates relative intensity noise (RIN) spectra of a typical distributed feedback semiconductor laser as may be used for optical transmission paths according to embodiments.
Figure 17:
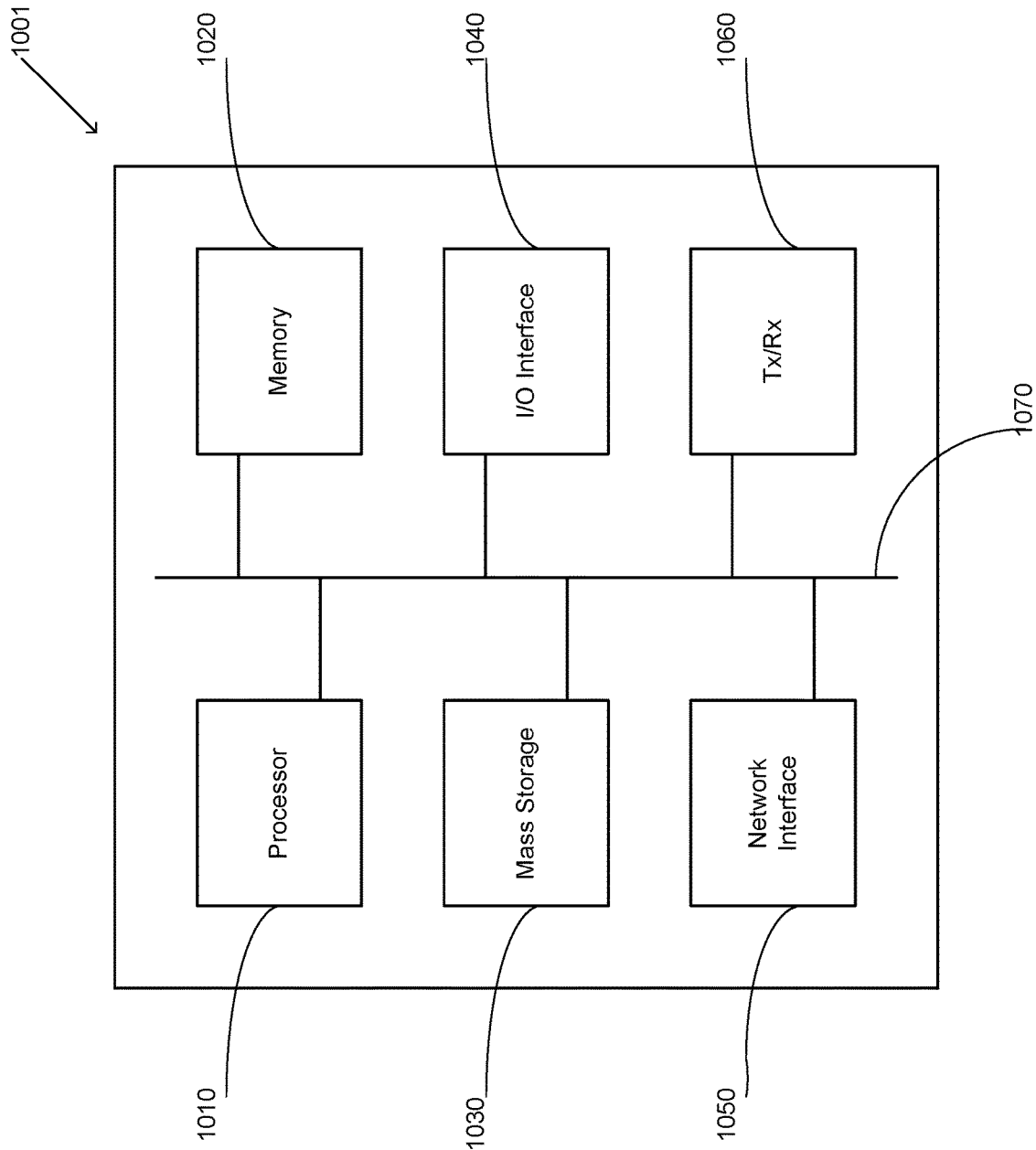
FIG. 17 is an exemplary block diagram of a processing system that may be used for implementing the controller 190 according to an embodiment.

FIG. 16 illustrates relative intensity noise (RIN) spectra of a typical distributed feedback semiconductor laser as may be used for RoF links discussed above. The RIN spectrum in FIG. 16 is illustrated for two example driving currents, respectively 50 mA and 100 mA. The vertical axis is the power spectral density of the RIN, and the horizontal axis is the frequency at which the RIN power spectral density is measured. This figure shows that the RIN has a maximum, known as the RIN peak, at an RF frequency around 6 to 8 GHz, and the RIN is lower by 10 to 15 dB at a frequency such as 2 GHz that is a lower frequency than the RIN peak frequency. Accordingly, the frequency shifter may be configured such that the frequency of the feedback signal is at such a lower frequency. Furthermore, the RIN is also lower than the RIN of the RIN peak at a higher frequency than the RIN peak frequency. Accordingly, for some embodiments using the frequency shifter may be configured such that the frequency of the feedback signal is at such higher frequency. The RIN spectrum and the frequency of the RIN peak vary depending on the laser structure, but nonetheless this general characteristic of a RIN peak with lower RIN at lower frequencies and higher frequencies is found in a wide variety of lasers.

While this disclosure has been described in terms of an RF downlink signal with a feedback path in the opposite direction (i.e. the feedback is in the same direction as an uplink), it should be understood that embodiments are equally applicable to an RF uplink signal with a feedback path in the opposite direction (i.e. the feedback is in the same direction as a downlink), In such an embodiment, the RF power amplifier is generally omitted and the signal source comprises an RF antenna and low-noise amplifier.

While examples in this disclosure are described in terms of a wireless network having a signal source/pre-distorter and a cell tower, it may also find application in RoF systems used in cable TV, satellite ground-stations, radar, and scientific instrumentation, where there is in general a first location comprising processing elements and a second location at the opposite end of RoF connections, with at least one RoF connection in each direction. Thus the term downlink more broadly refers to a direction from a processing location to a second location, and the term feedback refers to the opposite direction.

The type of pre-distortion used is not pertinent to this disclosure. Indeed, the actual use of DPD is not pertinent. Only the need for an RF signal in one direction and an RF feedback path in the other direction is necessary. For example, it may be that the RF feedback path is used only for monitoring the quality of the RF downlink signal, for example to identifying a degradation in quality in order to allow timely repairs. Alternatively, the RF feedback signal may be used by a control system at the processing location to adjust elements at the cell tower.

In the examples above, the term RoF link has been used as an example of an optical transmission path. Such an RoF link can be analog (ARoF), or some embodiments can transmit a digitized representation of the analog RF waveform using a Digital Radio over Fiber (DRoF). Examples of such RoF links can include Common Public Radio Interface (CPRI) or enhanced CPRI (eCPRT). In some embodiments one direction (e.g., the Downlink path) can use ARoF and the other direction (e.g., the feedback path) can use DRoF. Accordingly, while for brevity this specification is described in terms of analog signal transmission and analog feedback, it should be understood that either or both paths could be digital.

Further, in FIGS. 5 and 6, two downlink paths are used. As stated more than two downlink paths can be used. It should be appreciated that there are a variety of ways of carrying two (or more) downlink signals. For example there can be two physically separate paths: e.g. two fibers, where the 2 paths may or may not have same wavelength, and the 2 paths may or may not have same RF frequency. Alternatively the two downlink paths can be wavelength separated paths: e.g. two wavelengths on one fiber, where the 2 paths may or may not have same RF frequency. As a further alternative, the two downlink paths can be RF frequency separated paths: e.g. two RF frequencies on the same wavelength on the same fiber.

FIG. 18 is an exemplary block diagram of a processing system 1001 that may be used for implementing the various network functions. As shown in FIG. 11, processing system 1001 includes a processor 1010, working memory 1020, non-transitory storage 1030, network interface, I/O interface 1040, and depending on the node type, a transceiver 1060, all of which are communicatively coupled via bi-directional bus 1070.

According to certain embodiments, all of the depicted elements may be utilized, or only a subset of the elements. Further, the processing system 1001 may contain multiple instances of certain elements, such as multiple processors, memories, or transceivers. Also, elements of processing system 1401 may be directly coupled to other components without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage have recorded thereon statements and instructions executable by the processor for performing the aforementioned functions and steps.

The processing system 1001 can be used to implement the controllers described herein, including the controller 80, 190, 193 or a combined controller plus pre-distorter or frequency controller 155.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can include the device memory as described above, or stored in removable memory such as compact disk read-only memory (CD-ROM), flash memory, or a removable hard disk. The software product includes a number of instructions that enable a computer device (computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

The invention claimed is:

1. A system for transmitting a radio frequency (RF) signal from a source to a destination comprising:
   an RF signal source configured to produce an RF signal at a transmission frequency;
   an optical transmission path for optically transmitting the RF signal towards the destination; and
   a feedback path for transmitting a feedback signal received proximate the destination towards the RF signal source;
   the feedback path comprising:
      a frequency shifter configured to up-shift or down-shift a portion of an electrical RF signal at the transmission frequency depending on the transmission frequency for shifting the frequency of the feedback signal to a feedback frequency different than the transmission frequency.

2. The system of claim 1 wherein the optical transmission path converts the RF signal into an optical RF signal which is transmitted via an optical waveguide towards the destination and converted to the electrical RF signal at the transmission frequency proximate to the destination; and
   wherein the feedback path further comprises:
      an RF tap for forwarding the portion of the electrical RF signal to the frequency shifter which produces a feedback electrical RF signal;
      a feedback optical transmission path for converting the feedback electrical RF signal into a feedback optical signal at the feedback frequency which is transmitted towards the RF signal source.

3. A system for transmitting a radio frequency (RF) signal from a source to a destination comprising:
   an RF signal source configured to produce an RF signal at a transmission frequency;
   an optical transmission path for optically transmitting the RF signal towards the destination; and
   a feedback path for transmitting a feedback signal received proximate the destination towards the RF signal source, the feedback path comprising:
      a frequency shifter for shifting the frequency of the feedback signal to a feedback frequency different than the transmission frequency;
   wherein the optical transmission path converts the RF signal into an optical RF signal which is transmitted via an optical waveguide towards the destination and converted to an electrical RF signal at the transmission frequency proximate to the destination;
   wherein the feedback path further comprises:
      an RF tap for forwarding a portion of the electrical RF signal to the frequency shifter which produces a feedback electrical RF signal, and
      a feedback optical transmission path for converting the feedback electrical RF signal into a feedback optical signal at the feedback frequency which is transmitted towards the RF signal source;
   wherein the frequency shifter is configured such that the feedback frequency is within a feedback frequency range which is less susceptible to impairments introduced during optical transmission than the transmission frequency.

4. The system of claim 3 further comprising a pre-distorter for applying pre-distortion to the RF signal to compensate for distortion which occurs before the RF tap, with the pre-distortion dependent on the feedback signal.

5. The system of claim 4 further comprising a controller which receives the feedback signal and transmits a control signal to the pre-distorter.

6. The system of claim 4 wherein the RF tap is located before the RF power amplifier.

7. The system of claim 4 wherein the RF tap is located after the RF power amplifier.

8. The system of claim 4 wherein the RF tap is located before the RF power amplifier to produce a first tapped signal and further comprising:
   a second RF tap located after the RF power amplifier to produce a second tapped signal; and
   a switch for selectively coupling the frequency shifter between the first tapped signal and the second tapped signal.

9. The system of claim 4 wherein the RF signal source, the optical transmission path and the RF tap comprise a first downlink path and further comprising:
a second downlink path at a second transmission frequency; and
a selector switch for selectively coupling a tapped signal to the frequency shifter, the tapped signal selected from an RF tap of the first and second downlink paths such that feedback path is shared between the first downlink path and the second downlink path.

10. The system of claim 9 wherein the frequency shifter is configurable to shift the tapped signal to be within a feedback frequency range regardless of whether tapped signal is selected from the first downlink path or the second downlink path.

11. The system of claim 10 further comprising a frequency controller for configuring the frequency shifter such that the output from the frequency shifter is within the feedback frequency range for the feedback optical transmission path.

12. The system of claim 9 wherein the selector switch is configured to route tapped signals to a frequency shifter bypass for tapped signals which are already within the feedback frequency range.

13. The system of claim 6 further comprising a downlink path frequency shifter located after the RF tap for up-converting the electrical RF signal to a microwave signal.

14. The system of claim 11 further comprising a bandpass filter that filters the RF spectrum of the feedback signal such that only a portion or portions of the RF spectrum is transmitted on the optical feedback transmission path.

15. The system of claim 14 the bandpass filter is configured to pass distortion information sufficient for the controller to determine the pre-distortion to be applied by the pre-distorter.

16. The system of claim 3 further comprising a controller which monitors the feedback signal for faults.

17. A system for transmitting a radio frequency (RF) signal over an optical fiber comprising:
an RF signal source configured to produce an RF signal at a transmission frequency;
a pre-distorter for pre-distorting the RF signal;
an RF power amplifier;
a first Radio over Fiber (RoF) link for converting the RF signal into an RF optical signal and transmitting the RF optical signal from the radio frequency (RF) signal source towards the RF power amplifier, the RoF link including:
an optical transmitter,
an optical fiber, and
an optical receiver which converts the RF optical signal into an RF electrical signal; and
a feedback path including an RF analog tap for coupling a portion of the RF electrical signal to a second RoF link for transmitting the RF electrical signal towards the pre-distorter, the RF analog tap being disposed between the optical receiver and the RF power amplifier; and
wherein the feedback path further includes a frequency shifter configured to up-shift or down-shift a portion of an electrical RF signal at the transmission frequency depending on the transmission frequency, wherein the frequency shifter receives the portion of the RF electrical signal and outputs a frequency shifted RF signal, the frequency shifted RF signal being different than the transmission frequency.

18. The system of claim 17 wherein the frequency shifted RF signal is at a frequency subject to less impairments introduced by the RoF link than the transmission frequency.

19. The system of claim 18 wherein the RF signal source, the first RoF link and the analog tap comprise a first downlink path and further comprising:
a second downlink path at a second transmission frequency; and
a selector switch for selectively coupling a tapped signal to the frequency shifter, the tapped signal selected from an analog tap of the first and second downlink paths such that feedback path is shared between the first downlink path and the second downlink path.

* * * * *